US012752791B2

(12) United States Patent
Godovskii et al.

(10) Patent No.: US 12,752,791 B2
(45) Date of Patent: Oct. 6, 2026

(54) SYSTEMS AND METHODS FOR AUTOMOTIVE SENSING

(71) Applicant: PolyN Technology Limited, Bristol (GB)

(72) Inventors: Dmitrii Godovskii, Bucharest (RO); Boris Maslov, Palmetto, FL (US); Aleksandrs Timofejevs, Riga (LV)

(73) Assignee: PolyN Technology Limited, Bristol (GB)

( * ) Notice: Subject to any disclaimer, the term of this patent is extended or adjusted under 35 U.S.C. 154(b) by 15 days.

(21) Appl. No.: 18/797,499

(22) Filed: Aug. 7, 2024

(65) Prior Publication Data

US 2025/0236300 A1 Jul. 24, 2025

Related U.S. Application Data

(63) Continuation-in-part of application No. 18/418,212, filed on Jan. 19, 2024.

(51) Int. Cl.
*B60W 40/06* (2012.01)
*G06N 3/045* (2023.01)

(52) U.S. Cl.
CPC ............. *B60W 40/06* (2013.01); *G06N 3/045* (2023.01); *B60W 2420/10* (2013.01); *B60W 2422/70* (2013.01); *H04R 2201/003* (2013.01)

(58) Field of Classification Search
CPC ............. B60W 40/06; B60W 2420/10; B60W 2422/70; G06N 3/045; G06N 3/044; G06N 3/08; H04R 2201/003; H04R 1/08; H04R 2499/13
See application file for complete search history.

(56) References Cited

U.S. PATENT DOCUMENTS

| | | | | | |
|---|---|---|---|---|---|
| 5,003,490 | A * | 3/1991 | Castelaz | G06N 3/065 706/22 |
| 5,434,783 | A * | 7/1995 | Pal | G06N 3/09 700/280 |
| 5,586,028 | A * | 12/1996 | Sekine | B60T 8/174 701/1 |
| 5,765,119 | A * | 6/1998 | Otabe | B60T 8/172 701/80 |
| 12,043,263 | B2 | 7/2024 | Wang et al. | |
| 2016/0129737 | A1 | 5/2016 | Singh et al. | |
| 2020/0218974 | A1 | 7/2020 | Cheng et al. | |

(Continued)

OTHER PUBLICATIONS

PolyN Technology Limited, International Search Report and Written Opinion, PCT/US2025/011913, Apr. 29, 2025, 18 pgs.

*Primary Examiner* — Daryl C Pope
(74) *Attorney, Agent, or Firm* — SankerIP

(57) ABSTRACT

Systems, devices, integrated circuits, and methods are directed to on-vehicle data processing using analog hardware realization of neural networks. A vehicle obtains a temporal sequence of sensor data that is collected by a microphone of a sensor system. The sensor system is physically coupled to a tire of a vehicle. The neural network circuit generates one or more output data items based on the sensor data, and the one or more output data items indicate the condition of a road, the vehicle, or a component of the vehicle. The sensor system, including an electronic device that includes the microphone, is also described herein. A method of training the neural network is also described herein.

17 Claims, 22 Drawing Sheets

(56) References Cited

U.S. PATENT DOCUMENTS

| | | | |
|---|---|---|---|
| 2022/0036189 | A1 | 2/2022 | Courville et al. |
| 2022/0188628 | A1 | 6/2022 | Rasch et al. |
| 2022/0284470 | A1 | 9/2022 | Gee et al. |
| 2022/0379900 | A1 | 12/2022 | Kuehnle |
| 2023/0102576 | A1 | 3/2023 | Yaroshenko et al. |
| 2023/0406262 | A1 | 12/2023 | Stewart et al. |
| 2024/0218911 | A1 * | 7/2024 | Yuan ..................... F16D 66/027 |

* cited by examiner

440: a collection of 440RP and 440RN

SYSTEMS AND METHODS FOR AUTOMOTIVE SENSING

RELATED APPLICATIONS

This application is a continuation-in-part of U.S. application Ser. No. 18/418,212, filed Jan. 19, 2024, entitled "Neural Network Circuit for Vehicle Sensor Signal Processing," which is incorporated by reference herein in its entirety.

TECHNICAL FIELD

The disclosed embodiments relate generally to electronic devices, and more specifically to systems, devices, and methods for on-vehicle sensing using micro-electromechanical system devices (MEMS).

BACKGROUND

In modern vehicles, an intricate network of sensors plays a pivotal role in monitoring and collecting a vast array of data to ensure optimal performance, safety, and efficiency. These sensors, ranging from those embedded in the engine to those associated with advanced driver-assistance systems, continuously generate a substantial volume of data during operation. This data encompasses a diverse range of parameters such as engine performance, environmental conditions, and vehicle dynamics. To make sense of this wealth of information and enable informed decision-making, the data must be transmitted to a central processor within the vehicle's electronic control unit (ECU). This processor acts as the brain of the vehicle, orchestrating real-time analysis and adjustments to various systems. Efficient and timely transmission of this sensor-derived data to the processor is essential for maintaining the vehicle's optimal functionality, ensuring a smooth driving experience, and enhancing overall safety. It would be beneficial to have a more efficient data management mechanism for collect, communicate, and process sensor data of a vehicle than the current practice.

SUMMARY

Accordingly, there is a need for methods, systems, devices, circuits, and/or interfaces that address at least some of the deficiencies identified above and provide an efficient on-vehicle data management mechanism that relies on analog hardware realization of neural networks to process sensor data, providing better power and data communication performance than the current practice (e.g., which collects and processes sensor data in a vehicle's ECU in a consolidated manner). Analog neural network circuits have been modelled and manufactured to realize trained neural networks. In some embodiments, a neural network circuit is placed in proximity to a sensor unit (e.g., vibration and pressure sensors coupled to vehicle wheels) to collect sensor data captured by the sensor unit and generate one or more output data items to be streamed wirelessly to the vehicle's ECU for further processing. The one or more output data items are communicated to the ECU in place of the sensor data that has a large data volume. By these means, the neural network circuit helps reserve both a bandwidth of a data communication link and power consumption of an operating sensor node of the vehicle.

Some implementations of this application are directed to a neuromorphic analog signal processor (NASP) for assessing roadway conditions of a vehicle and tire integrity (e.g., tread wear) of automotive tires. The NASP is coupled to microphones, accelerometers, and/or a tire pressure sensor in a sensor unit and configured to receive vibration data captured (e.g., recorded) by the microphones, accelerometers, and/or a tire pressure sensor. In some embodiments, the sensor unit includes one or more of: a microphone, an accelerometer, and/or a tire pressure sensor, and operates continuously to generate sensor data samples at a rate in a range of 0-20 kHz. Further, in some situations, the sensor data samples are transmitted directly over a wireless communication link, which consumes substantial power and can only be implemented intermittently. Alternatively, in some embodiments, the NASP receives the sensor data samples and extracts embeddings (also called descriptors, features, or output data items) from analog signals associated with the sensor data samples. In some embodiments, these embeddings significantly reduce a volume of the sensor data sample, while providing comprehensive characterization of vibrations experienced at the vehicle's wheel components that can enable identification of diverse combinations of roadway conditions, tire structural integrity, tread wear, wheel bolt looseness, wheel bolt loss, and many other vehicle conditions.

In one aspect, an electronic device includes one or more sensors and a neural network circuit coupled to the sensor. The one or more sensors include a microphone. The one or more sensors are physically coupled to tires of a vehicle and are configured to collect a temporal sequence of sensor data according to vibrations recorded by the microphone. The neural network circuit is configured to receive the sensor data and generate one or more output data items based on analysis of the sensor data. The one or more output data items indicate the condition of a road, the condition of the vehicle, and/or the condition of a component of the vehicle.

In some embodiments, a method of processing vehicle data includes obtaining a temporal sequence of sensor data that is collected by one or more sensors. The one or more sensors include a microphone. The one or more sensors are physically coupled to one or more tires of a vehicle and are configured to collect a temporal sequence of sensor data corresponding to vibrations recorded by the microphone. The method also includes transmitting the temporal sequence of sensor data to a neural network circuit that is coupled to the sensors and analyzing, by the neural network circuit, the temporal sequence of sensor data. The method further includes generating, by the neural network circuit, one or more outputs that indicate the condition of a road, the condition of the vehicle, and/or the condition of a component of the vehicle.

In yet another aspect of this application, a method for training a neural network to identify a condition of the road includes receiving training data for a plurality of car driving instances. The training data for each instance includes: (i) respective vibration data collected by a microphone located inside a tire of a respective vehicle and (ii) a respective road condition over which the vehicle was traversing during collection of the respective vibration data. The method further includes, for each instance of the plurality of instances, forming a respective set of one or more inputs based on the respective vibration data. The method also includes training the neural network to identify a road condition using at least a subset of the plurality of instances.

In yet another aspect of this application, a method includes obtaining a temporal sequence of sensor data samples that is collected by one or more sensors physically coupled to a tire of a vehicle. The one or more sensors include a microphone and the temporal sequence of sensor data samples corresponds to vibrations recorded by the microphone. The method includes converting the temporal sequence of sensor data samples into a plurality of parallel data items and providing the plurality of parallel data items as a plurality of inputs to a neural network circuit. The method further includes generating, by the neural network circuit, one or more output data items based on the plurality of data items. The one or more output data items indicate the condition of a road, the condition the vehicle, and/or the condition of a component of the vehicle.

Thus, methods, systems, and devices as disclosed are implemented based on hardware realization of trained neural networks.

BRIEF DESCRIPTION OF THE DRAWINGS

For a better understanding of the aforementioned systems, methods, and devices, as well as additional systems, methods, and devices that provide analog hardware realization of neural networks, reference should be made to the Description of Embodiments below, in conjunction with the following drawings in which like reference numerals refer to corresponding parts throughout the figures.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Figure 1A:
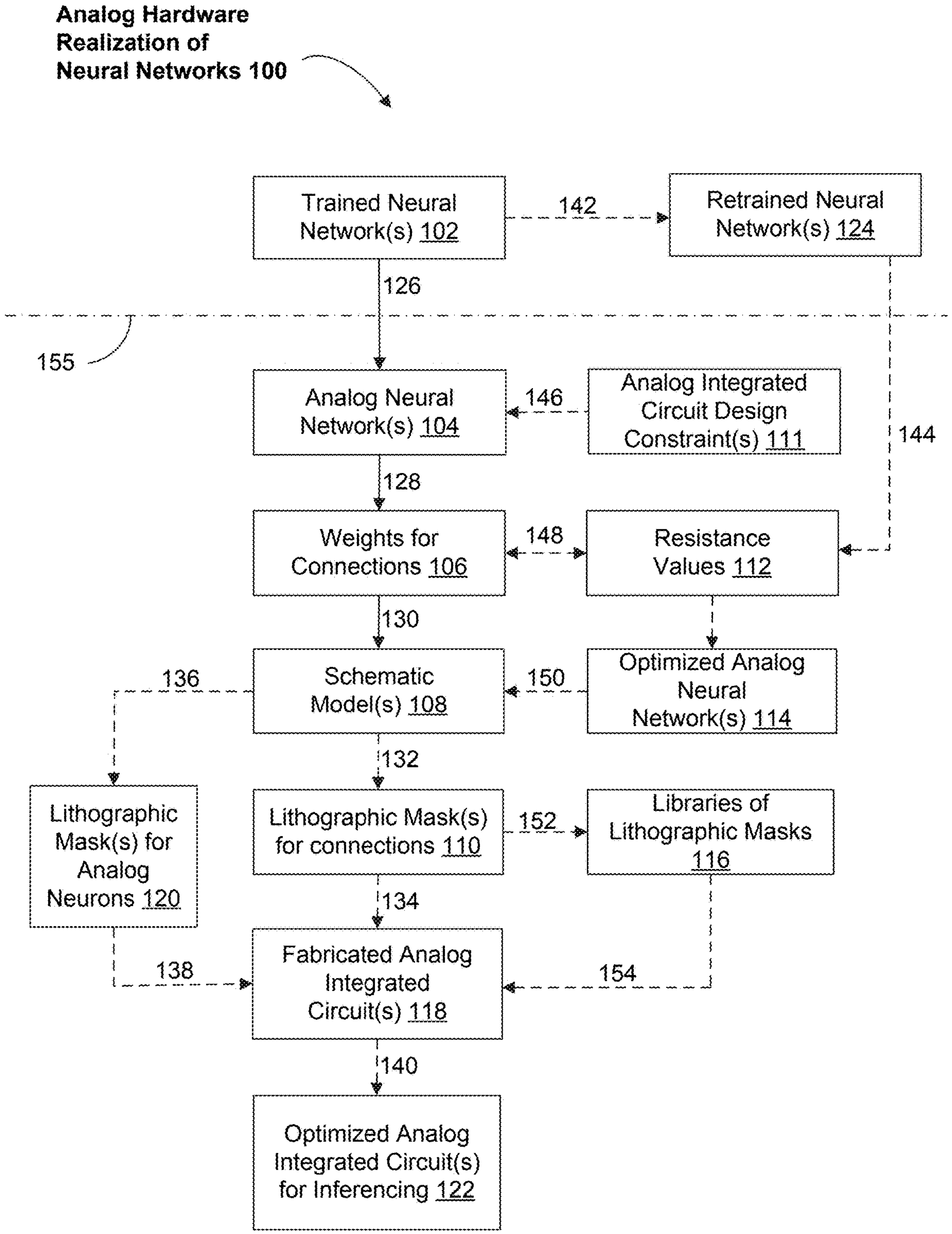
FIG. 1A is a block diagram of a system for hardware realization of trained neural networks using analog components, according to some embodiments.

FIG. 1A is a block diagram of a system 100 for hardware realization of trained neural networks using analog components, according to some embodiments. The system includes transforming (126) trained neural networks 102 to analog neural networks 104. In some embodiments, analog integrated circuit constraints 111 constrain (146) the transformation (126) to generate the analog neural networks 104. Subsequently, the system derives (calculates or generates) weights 106 for the analog neural networks 104 by a process that is sometimes called weight quantization (128). In some embodiments, the analog neural network includes a plurality of analog neurons, each analog neuron represented by an analog component, such as an operational amplifier, and each analog neuron is connected to other analog neurons via connections. In some embodiments, the connections are represented using resistors that reduce the current flow between two analog neurons. In some embodiments, the system transforms (148) the weights 106 to resistance values 112 for the connections. The system subsequently generates (130) one or more schematic models 108 for implementing the analog neural networks 104 based on the weights 106. In some embodiments, the system optimizes resistance values 112 (or the weights 106) to form optimized analog neural networks 114, which are further used to generate (150) the schematic models 108. In some embodiments, the system generates (132) lithographic masks 110 for the connections and/or generates (136) lithographic masks 120 for the analog neurons. In some embodiments, the system fabricates (134 and/or 138) analog integrated circuits 118 that implement the analog neural networks 104. In some embodiments, the system generates (152) libraries of lithographic masks 116 based on the lithographic masks 110 for connections and/or lithographic masks 120 for analog neurons. In some embodiments, the system uses (154) the libraries of lithographic masks 116 to fabricate the analog integrated circuits 118. In some embodiments, when the trained neural networks 102 are retrained (142) to form update neural networks 124, the system regenerates (or recalculates) (144) the resistance values 112 (and/or the weights 106), the schematic model 108, and/or the lithographic masks 110 for connections. In some embodiments, the system reuses the lithographic masks 120 for the analog neurons. In other words, in some embodiments, only the weights 106 (or the resistance values 112 corresponding to the changed weights), and/or the lithographic masks 110 for the connections are regenerated. Since only the connections, the weights, the schematic model, and/or the corresponding lithographic masks for the connections are regenerated, as indicated by the dashed line 155, the process for (or the path to) fabricating analog integrated circuits for the retrained neural networks is substantially simplified, and the time to market for re-spinning hardware for neural networks is reduced, when compared to conventional techniques for hardware realization of neural networks. In some embodiments, an optimization pass (140) constructs optimized analog integrated circuits (122) for inferencing.

Figure 1B:
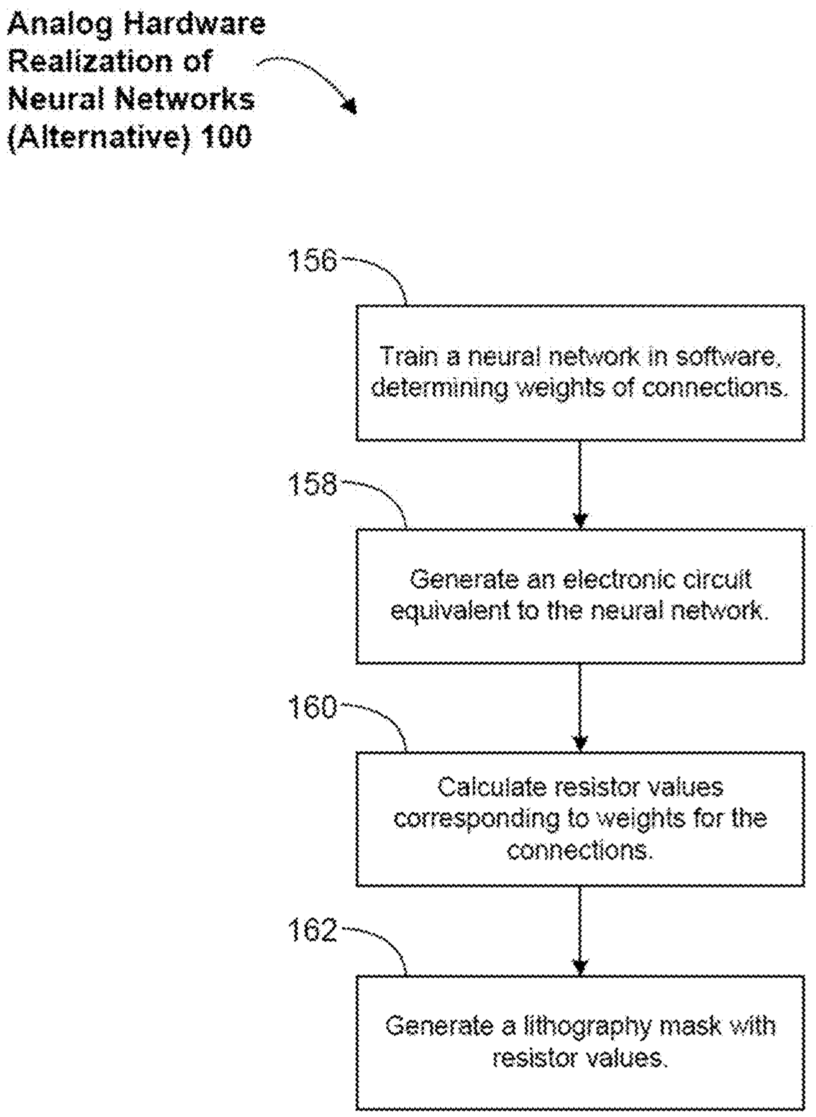
FIG. 1B is a block diagram of an alternative representation of the system of FIG. 1A for hardware realization of trained neural networks using analog components, according to some embodiments.

FIG. 1B is a block diagram of an alternative representation of the system 100 for hardware realization of trained neural networks using analog components, according to some embodiments. The system includes training (156) neural networks in software, determining weights of connections, generating (158) electronic circuit equivalent to the neural network, calculating (160) resistor values corresponding to weights of each connection, and subsequently generating (162) a lithography mask with resistor values.

The techniques described herein can be used to design and/or manufacture an analog neuromorphic integrated circuit that is mathematically equivalent to a trained neural network (either feed-forward or recurrent neural networks). According to some embodiments, the process begins with a trained neural network that is first converted into a transformed network comprised of standard elements. Operation of the transformed network is simulated using software with known models representing the standard elements. The software simulation is used to determine the individual resistance values for each of the resistors in the transformed network. Lithography masks are laid out based on the arrangement of the standard elements in the transformed network. Each of the standard elements are laid out in the masks using an existing library of circuits corresponding to the standard elements to simplify and speed up the process. In some embodiments, the resistors are laid out in one or more masks separate from the masks including the other elements (e.g., operational amplifiers) in the transformed network. In this manner, if the neural network is retrained, only the masks containing the resistors, or other types of fixed-resistance elements, representing the new weights in the retrained neural network need to be regenerated, which simplifies and speeds up the process. The lithography masks are then sent to a fab for manufacturing the analog neuromorphic integrated circuit.

In some embodiments, components of the system 100 described above are implemented in one or more computing devices or server systems as computing modules.

Figure 2A:
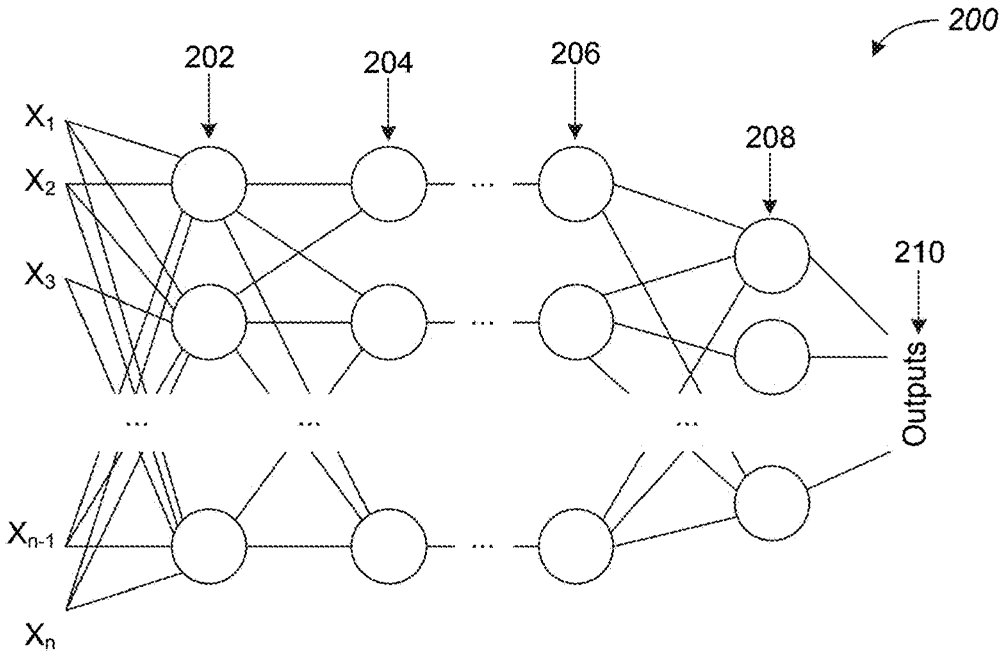
FIGS. 2A, 2B, and 2C are examples of trained neural networks that are input to a system and transformed to mathematically equivalent analog networks, according to some embodiments.
Figure 2B:
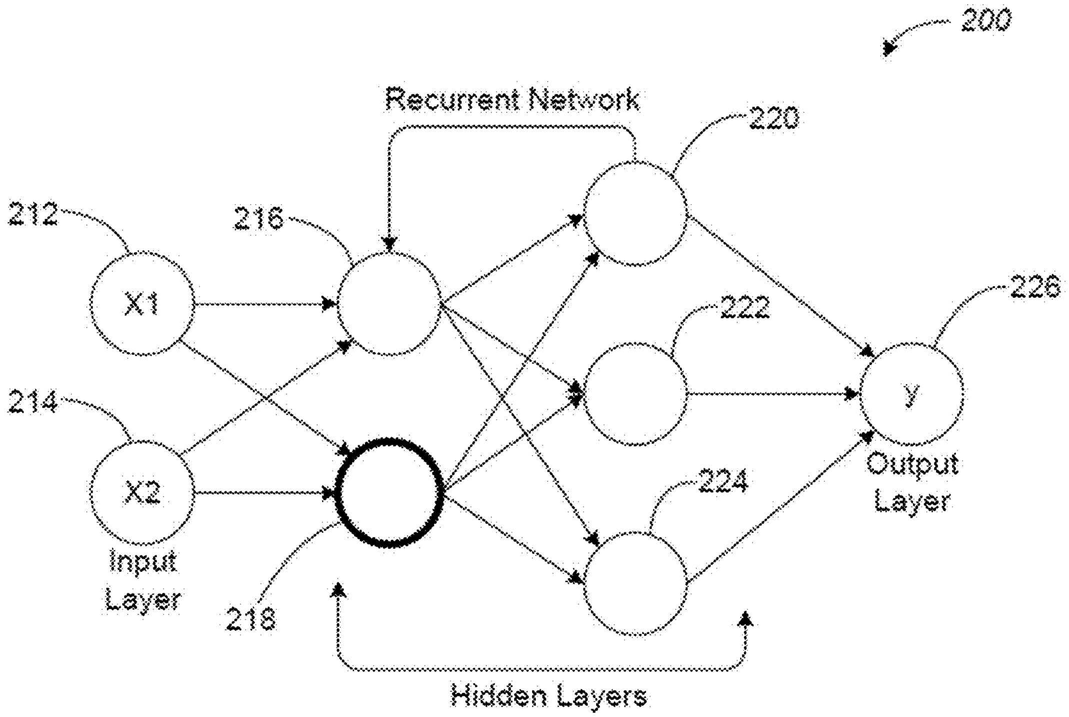
Figure 2C:
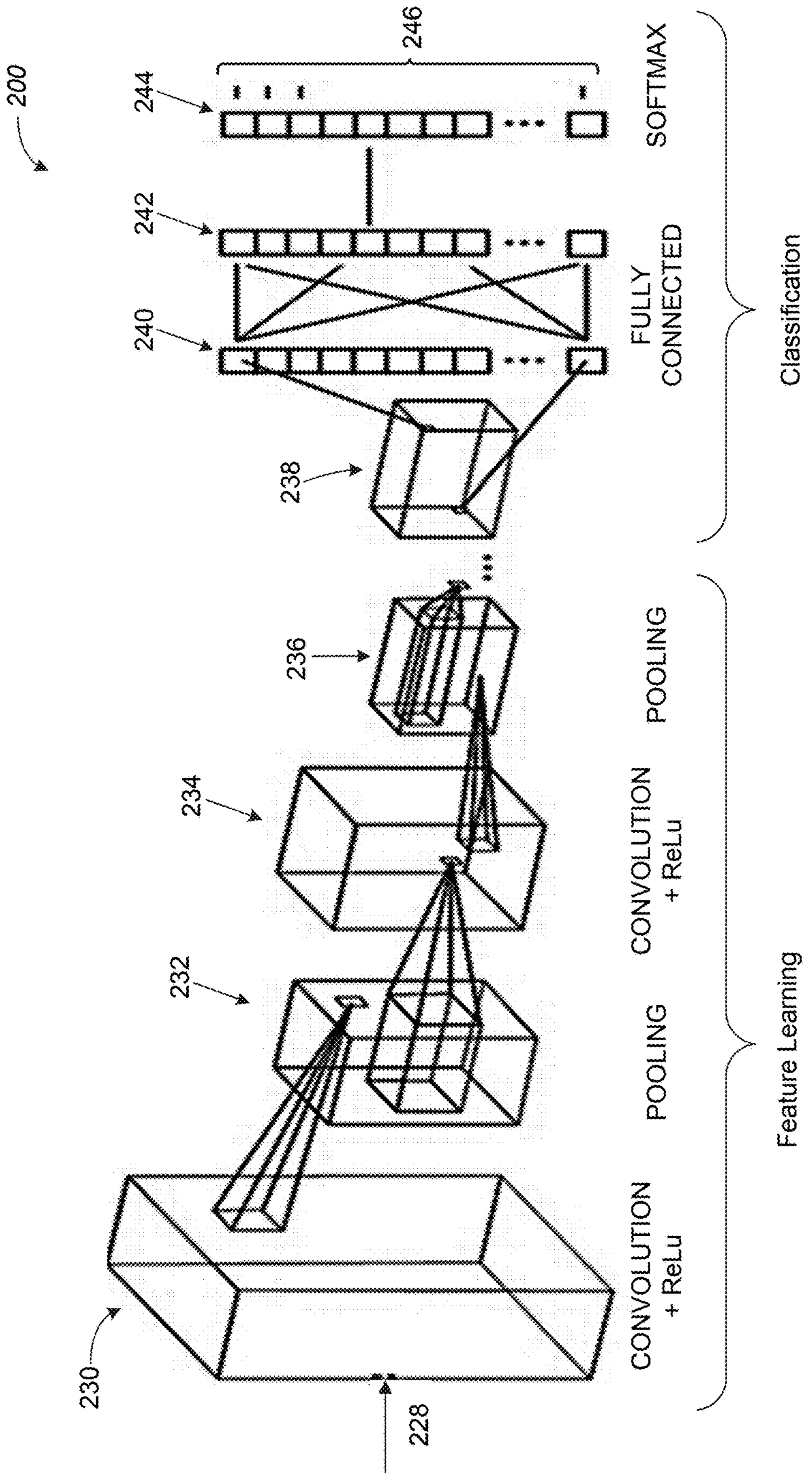

FIGS. 2A, 2B, and 2C show examples of trained neural networks 200 that are input to the system 100 and transformed into mathematically equivalent analog networks, according to some embodiments. FIG. 2A shows an example neural network 200 (sometimes called an artificial neural network) that is composed of artificial neurons that receive input, combine the input using an activation function, and produce one or more outputs. The input includes data, such as images, sensor data, and documents. Typically, each neural network performs a specific task, such as object recognition. The networks include connections between the neurons, each connection providing the output of a neuron as an input to another neuron. After training, each connection is assigned a corresponding weight. As shown in FIG. 2A, the neurons are typically organized into multiple layers, with each layer of neurons connected only to the immediately preceding and following layer of neurons. An input layer 202 of neurons receives external input (e.g., the inputs $X_1, X_2, \ldots, X_n$). The input layer 202 is followed by one or more hidden layers of neurons (e.g., the layers 204 and 206), which is followed by an output layer 208 that produces outputs 210. Various types of connection patterns connect neurons of consecutive layers, such as a fully-connected pattern that connects every neuron in one layer to all the neurons of the next layer, or a pooling pattern that connects output of a group of neurons in one layer to a single neuron in the next layer. In contrast to the neural network shown in FIG. 2A that is sometimes called a feedforward network, the neural network shown in FIG. 2B includes one or more connections from neurons in one layer to either other neurons in the same layer or neurons in a preceding layer. The example shown in FIG. 2B is an example of a recurrent neural network and includes two input neurons 212 (that accepts an input X1) and 214 (that accepts an input X2) in an input layer followed by two hidden layers. The first hidden layer includes neurons 216 and 218, which are fully connected with neurons in the input layer, and the neurons 220, 222, and 224 in the second hidden layer. The output of the neuron 220 in the second hidden layer is connected to the neuron 216 in the first hidden layer, providing a feedback loop. The hidden layer including the neurons 220, 222, and 224 provides input to a neuron 226 in the output layer that produces an output y.

FIG. 2C shows an example of a convolutional neural network (CNN), according to some embodiments. In contrast to the neural networks shown in FIGS. 2A and 2B, the example shown in FIG. 2C includes different types of neural network layers, which includes a first stage of layers for feature learning, and a second stage of layers for classification tasks, such as object recognition. The feature learning stage includes a convolution and Rectified Linear Unit (ReLU) layer 230, followed by a pooling layer 232, which is followed by another convolution and ReLU layer 234, which is in turn followed by another pooling layer 236. The first layer 230 extracts features from an input 228 (e.g., an input image or portions thereof), and performs a convolution operation on its input, and one or more non-linear operations (e.g., ReLU, tanh, or sigmoid). A pooling layer, such as the layer 232, reduces the number of parameters when the inputs are large. The output of the pooling layer 236 is flattened by the layer 238 and input into a fully connected neural network with one or more layers (e.g., the layers 240 and 242). The output of the fully-connected neural network is input to a softmax layer 244 to classify the output of the layer 242 of the fully-connected network to produce one of many different outputs 246 (e.g., object class or type of the input image 228).

Some embodiments store the layout or the organization of the input neural networks including the number of neurons in each layer, the total number of neurons, operations, or activation functions of each neuron, and/or the connections between the neurons, in the memory 214, as the neural network topology.

Figure 3:
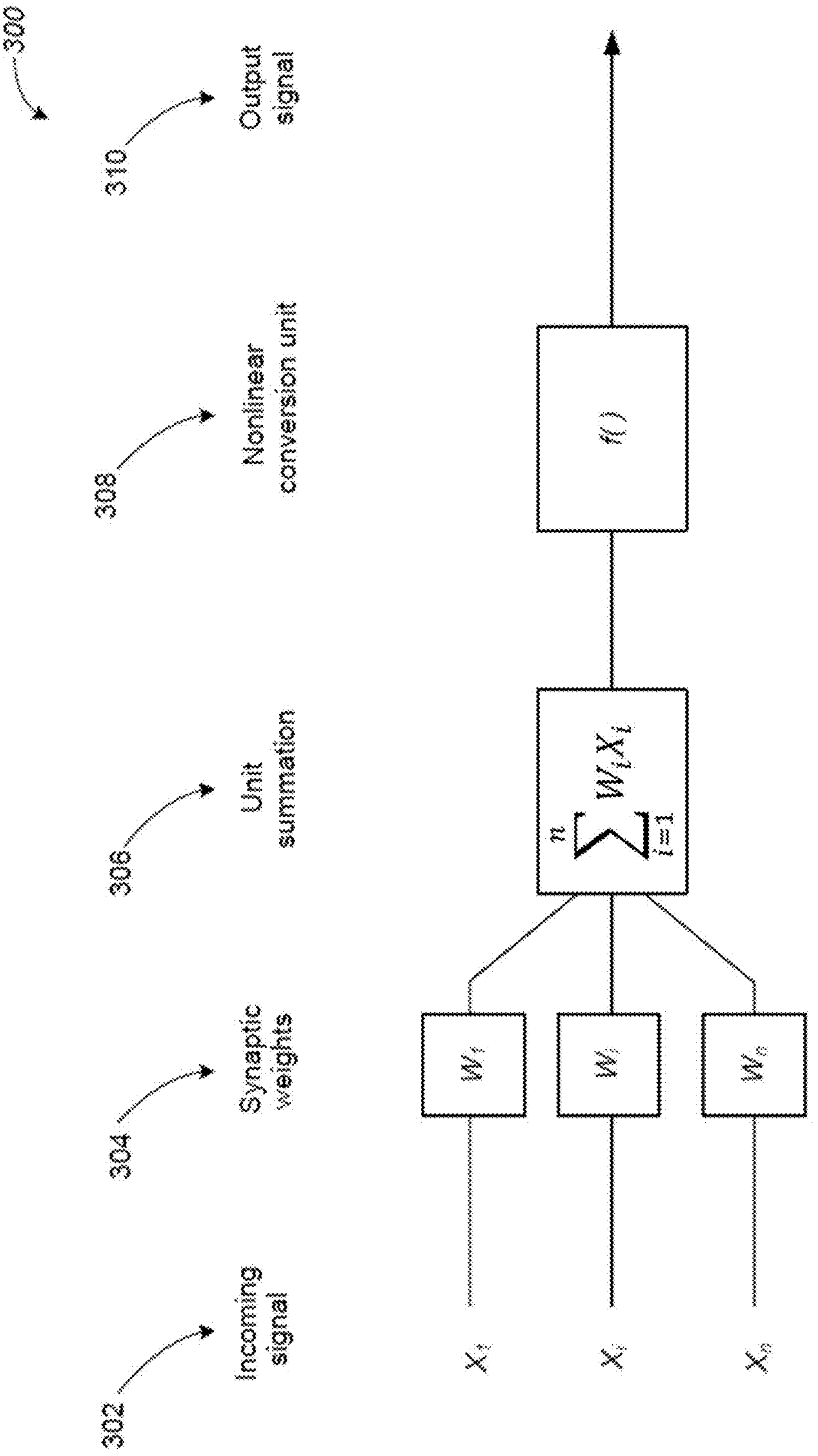
FIG. 3 shows an example of a mathematical model for a neuron, according to some embodiments.

FIG. 3 shows an example of a mathematical model 300 for a neuron, according to some embodiments. The mathematical model includes incoming signals 302 multiplied by synaptic weights 304 and summed by a unit summation 306. The result of the unit summation 306 is input to a nonlinear conversion unit 308 to produce an output signal 310, according to some embodiments.

In some embodiments, the example computations described herein are performed by a weight matrix computation or weight quantization module (e.g., using a resistance calculation module), which computes the weights for connections of the transformed neural networks, and/or corresponding resistance values for the weights.

This section describes an example process for quantizing resistor values corresponding to weights of a trained neural network, according to some embodiments. The example process substantially simplifies the process of manufacturing chips using analog hardware components for realizing neural networks. As described above, some embodiments use resistors to represent neural network weights and/or biases for operational amplifiers that represent analog neurons. The example process described here specifically reduces the complexity in lithographically fabricating sets of resistors for the chip. With the procedure of quantizing the resistor values, only select values of resistances are needed for chip manufacture. In this way, the example process simplifies the overall process of chip manufacture and enables automatic resistor lithographic mask manufacturing on demand.

Figure 4:
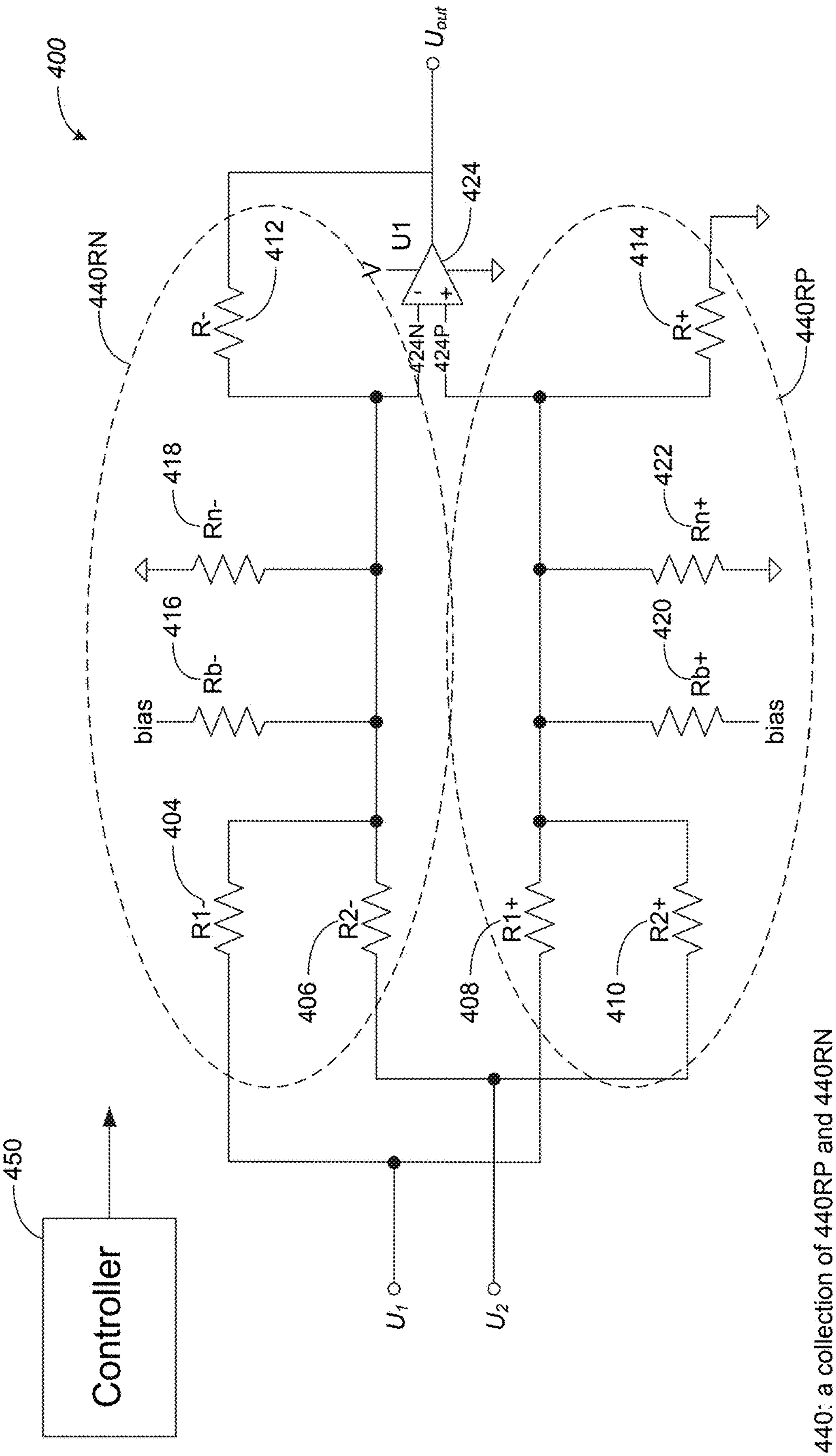
FIG. 4 is a schematic diagram of an example neuron circuit for a neuron of a neural network used for resistor quantization, according to some embodiments.

FIG. 4 is a schematic diagram of an example neuron circuit 400 for a neuron of a neural network used for resistor quantization, according to some embodiments. In some embodiments, the neuron circuit 400 is based on an operational amplifier 424 (e.g., AD824 series precision amplifier) that receives input signals $U_1$ and $U_2$ from a set of negative weight resistors 440RN (R1− 404, R2− 406, Rb− bias 416, Rn− 418, and R− 412) and a set of positive weight resistors 440RP (R1+ 408, R2+ 410, Rb+ bias 420, Rn+ 422, and R+ 414). The positive and negative weight resistors 440RP and 440RN are collectively called weight resistors 440. The positive weight resistors 440RP are coupled to a positive input 424P of the operational amplifier 424, and the negative weight resistors 440RN are coupled to a negative input 424N of the operational amplifier 424. The weight resistors 440 form a feedback network for the operational amplifier 424, allowing the operational amplifier 424 to implement a weighted summation operation on the input signals $U_1$ and $U_2$. The positive weighting resistors 440RP correspond to positive weights of the neuron corresponding to the neuron circuit 400, and the negative weighting resistors 440RN correspond to negative weights of the neuron corresponding to the neuron circuit 400. In some embodiments, the operational amplifier 424 is configured to combine the input signal $U_1$ and $U_2$ to facilitate normal circuit operation (e.g., linearly) and the output signal $U_{out}$ is output in a nominal voltage range between two power supplies of operational amplifier 424. In some embodiments, the operational amplifier 424 accomplishes ReLU transformation of the output signal $U_{out}$ at its output cascade.

Stated another way, in some embodiments, a neural network includes a plurality of layers, each of which includes a plurality of neurons. The neural network is implemented using an analog circuit including a plurality of resistors 440 and a plurality of amplifiers 424, and each neuron is implemented using at least a subset of resistors (e.g., positive weighting resistors 440RP and negative weighting resistors 440RN) and one or more amplifiers (e.g., amplifier 424). The neuron circuit 400 includes a combination circuit including an operational amplifier 424, a subset of resistors 440, two or more input interfaces, and an output interface. The combination circuit is configured to obtain two or more input signals (e.g., $U_1$ and $U_2$) at the two or more input interfaces, combine the two or more input signals (e.g., in a substantially linear manner), and generate an output $U_{out}$. Broadly, the two or more input signals includes a number N of signals, and is linearly combined to generate the output $U_{out}$ as follows:

$$U_{out} = \sum_{i=1}^{N} \left( \frac{R^+}{R_i^+} - \frac{R^-}{R_i^-} \right) U_i. \quad (1)$$

For each input signal $U_i$, a corresponding weight $w_i$ is determined based on resistance of the subset of resistors 440 as follows:

$$w_i = \frac{R^+}{R_i^+} - \frac{R^-}{R_i^-}. \quad (2)$$

For example, referring to FIG. 4, the neuron model 400 receives two input signals $U_1$ and $U_2$, and linearly combines the input signals $U_1$ and $U_2$ to generate an output $U_{out}$. Weights applied to combine the input signals $U_1$ and $U_2$ are determined based on resistances of the resistors 400RP and 400RN used in the neuron circuit 400. The output $U_{out}$ and the weights $w_1$ and $w_2$ are determined as follows:

$$U_{out} = w_1 U_1 + w_2 U_2. \quad (3)$$

For each input signal $U_i$, a corresponding weight $w_i$ is determined as follows:

$$w_1 = \frac{R^+}{R_1^+} - \frac{R^-}{R_1^-} \text{ and } w_2 = \frac{R^+}{R_2^+} - \frac{R^-}{R_2^-}. \quad (4)$$

In some embodiments, the following optimization procedure is applied to quantize resistance values of each resistance and minimize an error of the output $U_{out}$:

1. Obtain a set of connection weights and biases $\{w_1, \ldots, w_n, b\}$;
2. Obtain possible minimum and maximum resistor values $\{R_{min}, R_{max}\}$, which are determined based on the technology used for manufacturing;
3. Assume that each resistor has r_err relative tolerance value;
4. Select a set of resistor values $\{R_1, \ldots, R_n\}$ of given length N within the defined $[R_{min}; R_{max}]$, based on $\{w_1, \ldots, w_n, b\}$ values, where an example search algorithm is provided below to find sub-optimal $\{R_1, \ldots, R_n\}$ set based on particular optimality criteria; and
5. Apply another algorithm to choose $\{R_n, R_p, R_{ni}, R_{pi}\}$ for a network given that $\{R_1 \ldots R_n\}$ is determined.

Some embodiments use TaN or Tellurium high resistivity materials. In some embodiments, the minimum value $R_{min}$ of resistor 440 is determined by minimum square that can be formed lithographically. The maximum value $R_{max}$ is determined by length, allowable for resistors (e.g., resistors made from TaN or Tellurium) to fit to the desired area, which is in turn determined by the area of an operational amplifier square on lithographic mask. In some embodiments, the area of arrays of resistors 440RN and 440PR is formed in back end of line (BEOL), which allows the arrays of resistors are stacked, and is smaller in size than the area of the operational amplifier 424 formed in front end of line (FEOL).

Some embodiments use an iterative approach for resistor set search. Some embodiments select an initial (random or uniform) set {R1, . . . , Rn} within the defined range. Some embodiments select one of the elements of the resistor set as a R−=R+ value. Some embodiments alter each resistor within the set by a current learning rate value until such alterations produce 'better' set (according to a value function). This process is repeated for all resistors within the set and with several different learning rate values, until no further improvement is possible.

In some embodiments, a value function of a resistor set is defined. Specifically, possible weight options are calculated for each weight $w_i$ according to equation (2). Expected error value for each weight option is estimated based on potential resistor relative error r_err determined by IC manufacturing technology. Weight options list is limited or restricted to [−wlim; wlim] range. Some values, which have expected error beyond a high threshold (e.g., 10 times r_err), are eliminated. The value function is calculated as a square mean of distance between two neighboring weight options. In an example, the weight options are distributed uniformly within [−wlim; wlim] range, and the value function is minimal.

In an example, the required weight range [−wlim; wlim] for a neural network is set to [−5, 5], and the other parameters include N=20, r_err=0.1%, rmin=100 KΩ, rmax=5 MΩ. Here, rmin and rmax are minimum and maximum values for resistances, respectively.

In one instance, the following resistor set of length 20 was obtained for abovementioned parameters: [0.300, 0.461, 0.519, 0.566, 0.648, 0.655, 0.689, 0.996, 1.006, 1.048, 1.186, 1.222, 1.261, 1.435, 1.488, 1.524, 1.584, 1.763, 1.896, 2.02] MΩ. Resistances of both resistors R− and R+ are equal to 1.763 MΩ.

Some embodiments determine Rn and Rp using an iterative algorithm such as the algorithm described above. Some embodiments set Rp=Rn (the tasks to determine Rn and Rp are symmetrical—the two quantities typically converge to a similar value). Then for each weight $w_i$, some embodiments select a pair of resistances {Rni, Rpi} that minimizes the estimated weight error value:

$$w_{err} = \left(\frac{R^+}{R_i^+} + \frac{R^-}{R_i^-}\right)\cdot r_{err} + \left|w_i - \frac{R^+}{R_i^+} + \frac{R^-}{R_i^-}\right| \quad (5)$$

Some embodiments subsequently use the {Rni; Rpi; Rn; Rp} values set to implement neural network schematics. In one instance, the schematics produced mean square output error (sometimes called S mean square output error, described above) of 11 mV and max error of 33 mV over a set of 10,000 uniformly distributed input data samples, according to some embodiments. In one instance, S model was analyzed along with digital-to-analog converters (DAC), analog-to-digital converters (ADC), with 256 levels as a separate model. The S model produces 14 mV mean square output error and 49 mV max output error on the same data set, according to some embodiments. DAC and ADC have levels because they convert analog value to bit value and vice-versa. 8 bits of digital value is equal to 256 levels. Precision cannot be better than 1/256 for 8-bit ADC.

Some embodiments calculate the resistance values for analog IC chips, when the weights of connections are known, based on Kirchhoff's circuit laws and basic principles of operational amplifiers (described below in reference to FIG. 5), using Mathcad or any other similar software. In some embodiments, operational amplifiers are used both for amplification of signal and for transformation according to the activation functions (e.g., ReLU, sigmoid, Tangent hyperbolic, or linear mathematical equations).

Some embodiments manufacture resistors in a lithography layer where resistors are formed as cylindrical holes in the $SiO_2$ matrix, and the resistance value is set by the diameter of hole. Some embodiments use amorphous TaN, TiN of CrN or Tellurium as the highly resistive material to make high density resistor arrays. Some ratios of Ta to N Ti to N and Cr to N provide high resistance for making ultra-dense high resistivity elements arrays. For example, for TaN, $Ta_5N_6$, $Ta_3N_5$, the higher the N ratio to Ta, the higher is the resistivity. Some embodiments use $Ti_2N$, TIN, CrN, or $Cr_5N$, and determine the ratios accordingly. TaN deposition is a standard procedure used in chip manufacturing and is available at all major Foundries.

In some embodiments, a subset of weight resistors 440 have variable resistance. For example, the subset of weight resistors 440 includes resistors R+ 414, R2+ 410, and R1− 404. Further, in some embodiments, a neural network includes a plurality of neural layers, and the subset of weight resistors 440 having variable resistance are applied to implement neurons in a subset of neural layers that is directly coupled to an output of the neural network. For example, the neural network has more than 10 layers, and weight resistors 440 having variable resistance is used to implement one or more neurons in the last one or two layers of the neural network. More details on resistor-based weight adjustment in the neuron circuit 400 are explained below with reference to FIGS. 6A-11.

Figure 5:
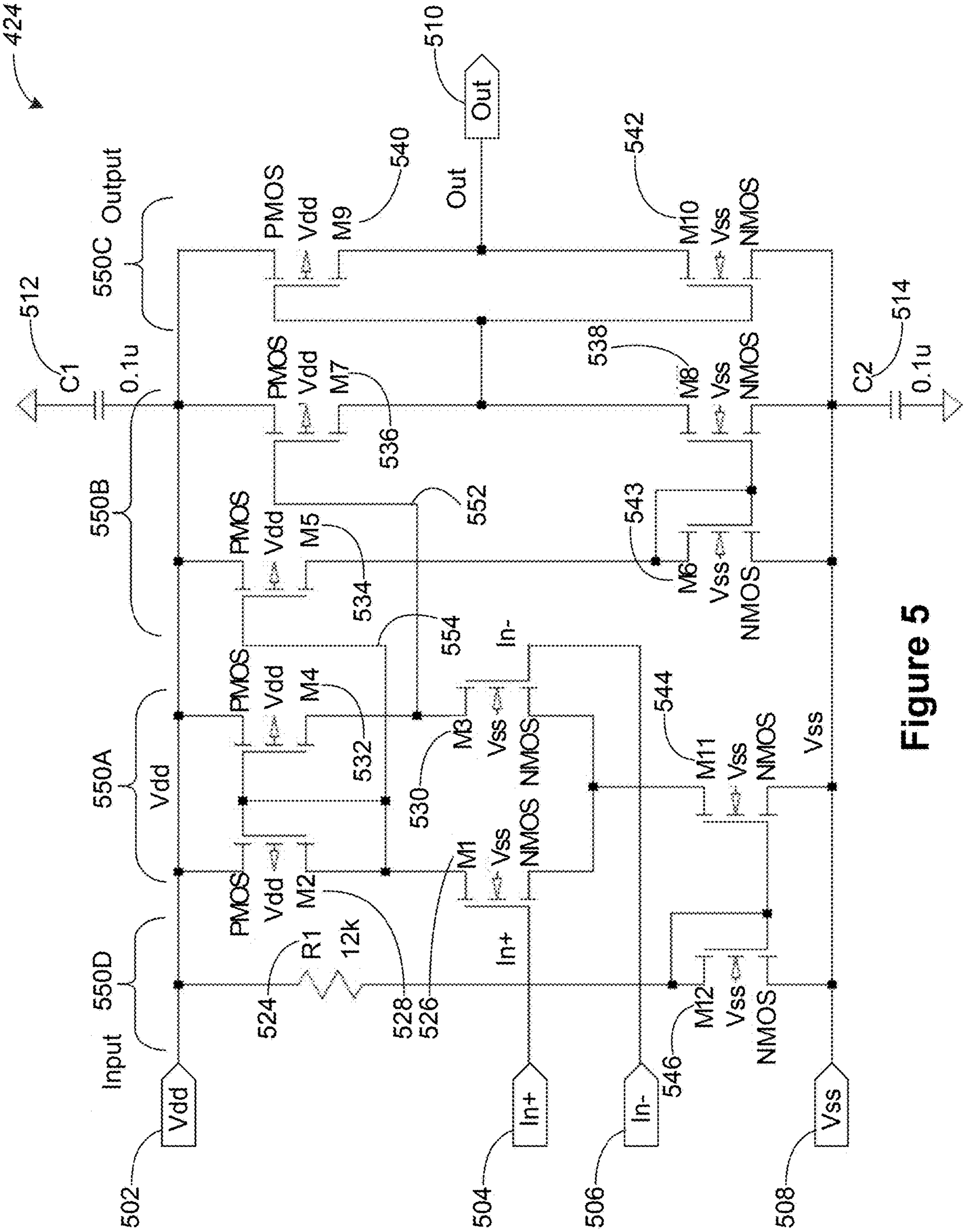
FIG. 5 is a schematic diagram of an example operational amplifier, according to some embodiments.

FIG. 5 is a schematic diagram of an example operational amplifier 424, according to some embodiments. In some embodiments, the operational amplifier 424 is applied to form the neuron circuit 400 shown in FIG. 4. The operational amplifier 424 is coupled to a feedback network including a set of negative weight resistors 440RN and a set of positive weight resistors 440RP, forming the neuron circuit 400 configured to combine a plurality of input signals $U_1$ (e.g., $U_1$ and $U_2$) and generate an output $U_{out}$. The operational amplifier 424 includes a two-stage amplifier having N-type different inputs. The differential inputs include a positive input 504 (In+) and a negative input 506 (In−). The operational amplifier 424 is powered by two power supplies, e.g., a positive supply voltage 502 (Vdd), a negative supply voltage 508 (Vss) or a ground GND.

The operational amplifier 424 includes a plurality of complementary metal-oxide semiconductor (CMOS) transistors (e.g., having both P-type transistors and N-type transistors). In some embodiments, performance parameters of each CMOS transistor (e.g., drain current ID) are determined by a ratio of geometric dimensions: W (a channel width) to L (a channel length) of the respective CMOS transistor. The operational amplifiers 424 includes one or more of a differential amplifier stage 550A, a second amplifier stage 550B, an output stage 550C, and a biasing stage 550D. Each circuit stage of the operational amplifier 424 is formed based on a subset of the CMOS transistors.

A biasing stage 550D includes NMOS transistor M12 546 and resistor R1 524 (with an example resistance value of 12 kΩ, and is configured to generate a reference current. A current mirror is formed based on NMOS transistors M11 544 and M12 546, and provides an offset current to the differential pair (M1 526 and M3 530) based on the reference current of the biasing stage 550D. The differential amplifier stage 550A (differential pair) includes NMOS transistors M1 526 and M3 530. Transistors M1, M3 are amplifying, and PMOS transistors M2 528 and M4 532 play a role of active current load. A first amplified signal 552 is outputted from a drain of transistor M3 530, and provided to drive a gate of PMOS transistor M7 536 of a second amplifier stage 500B. A second amplified signal 554 is outputted from a drain of transistor M1 526, and provided to drive a gate of PMOS transistor M5 (inverter) 534, which is an active load on the NMOS transistor M6 543. A current flowing through the transistor M5 534 is mirrored to the NMOS transistor M8 538. Transistor M7 536 is included with a common source for a positive half-wave signal. The M8 transistor 538 is enabled by a common source circuit for a negative half-wave signal. The output stage 550C of the operational amplifier 424 includes P-type transistor M9 540 and N-type transistor M10 542, and is configured to increase an overall load capacity of the operational amplifier 424. In some embodiments, a plurality of capacitors (e.g., C1 512 and C2 514) is coupled to the power supplies 502 and 508, and configured to reduce noise coupled into the power supplies and stabilize the power supplies 502 and 508 for the operational amplifier 424.

In some embodiments, an electronic device includes a plurality of resistors 440RN and 440RP and one or more amplifiers 424 coupled to the plurality of resistors 440RN and 440RP. In some embodiments, the one or more amplifiers 424 and the plurality of resistors 440RN and 440RP are formed on a substrate of an integrated circuit. In some embodiments, the integrated circuit implementing the neural network is packaged and used in an electronic device as a whole. Conversely, in some embodiments, at least one of the one or more amplifiers 424 is formed on an integrated circuit, and packaged and integrated on a printed circuit board (PCB) with remaining resistors or amplifiers of the same neural network. In some embodiments, the plurality of resistors 440RN and 440RP and the one or more amplifiers 424 of the same neural network are formed on two or more separate integrated circuit substrates, which are packaged separately and integrated on the same PCB to form the electronic device. Two or more packages of the electronic device are configured to communicate signals with each other and implement the neural network collaboratively.

Analog circuits that model trained neural networks and manufactured according to the techniques described herein, can provide improved performance per watt advantages, can be useful in implementing hardware solutions in edge environments, and can tackle a variety of applications, such as drone navigation and autonomous cars. The cost advantages provided by the proposed manufacturing methods and/or analog network architectures are even more pronounced with larger neural networks. Also, analog hardware embodiments of neural networks provide improved parallelism and neuromorphism. Moreover, neuromorphic analog components are not sensitive to noise and temperature changes, when compared to digital counterparts.

Chips manufactured according to the techniques described herein provide order of magnitude improvements over conventional systems in size, power, and performance, and are ideal for edge environments, including for retraining purposes. Such analog neuromorphic chips can be used to implement edge computing applications or in Internet-of-Things (IoT) environments. Due to the analog hardware, initial processing (e.g., formation of descriptors for image recognition), that can consume over 80-90% of power, can be moved on chip, thereby decreasing energy consumption and network load that can open new markets for applications.

Various edge applications can benefit from use of such analog hardware. For example, for video processing, the techniques described herein can be used to include direct connection to CMOS sensor without digital interface. Various other video processing applications include road sign recognition for automobiles, camera-based true depth and/or simultaneous localization and mapping for robots, room access control without server connection, and always-on solutions for security and healthcare. Such chips can be used for data processing from radars and lidars, and for low-level data fusion. Such techniques can be used to implement battery management features for large battery packs, sound/voice processing without connection to data centers, voice recognition on mobile devices, wake up speech instructions for IoT sensors, translators that translate one language to another, large sensors arrays of IoT with low signal intensity, and/or configurable process control with hundreds of sensors.

Neuromorphic analog chips can be mass produced after standard software-based neural network simulations/training, according to some embodiments. A client's neural network can be easily ported, regardless of the structure of the neural network, with customized chip design and production. Moreover, a library of ready to make on-chip solutions (network emulators) are provided, according to some embodiments. Such solutions require only training, one lithographic mask change, following which chips can be mass produced. For example, during chip production, only part of the lithography masks need to be changed.

Figure 6A:
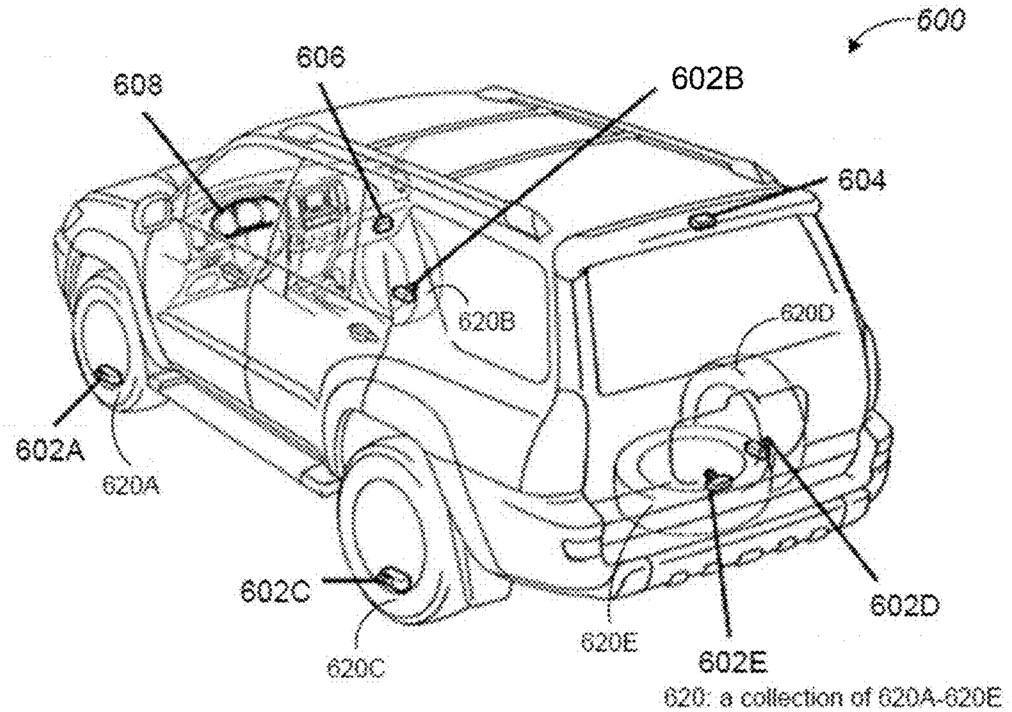
FIGS. 6A and 6B is a perspective view and a bottom view of an example vehicle including a tire sensor system, according to some embodiments.
Figure 6B:
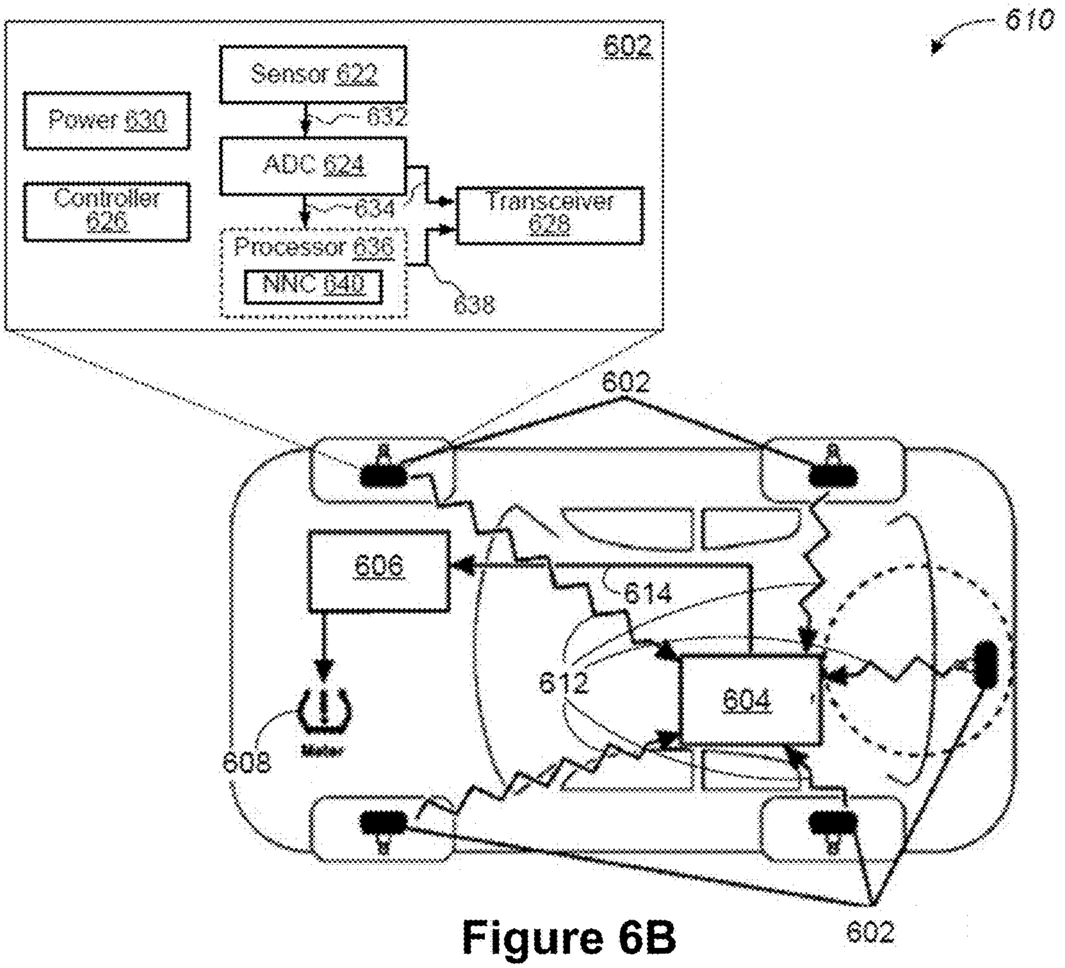

FIGS. 6A and 6B provide a perspective view and a bottom view of an example vehicle 600 including a tire sensor system 610, according to some embodiments. The tire sensor system 610 is configured to monitor air pressure inside a pneumatic tire 620 and/or vibrations at the tire 620 on the vehicle 600. The tire sensor system 610 includes a sensor system 602, a tire monitor receiver 604, an electronic control unit (ECU) 606, and a tire pressure indicator 608. The sensor system 602 includes one or more sensor units 602 (e.g., 602A-602E) coupled to, or integrated on, one or more tires of the vehicle 600, and is configured to measure an analog sensor signal associated with tire pressure of a tire and/or vibrations experienced at the tire, and sample the analog sensor signal based on a sampling rate to generate a temporal sequence of sensor data samples 634. The tire monitor receiver 604 is communicatively coupled to the sensor system 602 to receive data provided by the sensor system 602 via a wireless communication link 612. In some embodiments, the wireless communication link 612 is established in accordance with one of a Bluetooth Low Energy (BLE) protocol and a low power device 433 MHZ (LPD433) protocol. The tire monitor receiver 604 is coupled to, or integrated with, the ECU 606, and the ECU 606 is configured to receive and process the data provided by the sensor system 602 via the tire monitor receiver 604. In some embodiments, the tire monitor receiver 604 is communicatively coupled to the ECU 606 via a wired or wireless communication link 614. Alternatively, in some embodiments, the tire monitor receiver 604 is integrated in the ECU 606. In some embodiments, the ECU 606 detects a condition with the vehicle 600 or one of the tires, and reports the condition to a user using the tire pressure indicator 608. Examples of the tire pressure indicator 608 include, but are not limited to, a light emitting diode indicator, a tire status light displayed on a front panel, and an information item of a user interface displayed on a screen of the vehicle 600. In some embodiments, the ECU 606 detects a change in the condition of the road and reports the change to the user or to the ECU 606 of the vehicle 600.

In some embodiments, the one or more sensor units 602 of the sensor system are distributed on the one or more tires 620 of the vehicle 600. For example, the one or more sensor units include a plurality of sensor units 602 disposed on a plurality of tires 620 of the vehicle 600. More specifically, in an example, the plurality of sensor units 602 includes five sensor units 602A, 602B, 602C, 602D, and 602E coupled to a left front tire 620A, a right front tire 620B, a left rear tire 620C, a right rear tire 620D, and a spare tire 620E, respectively. In some embodiments, each sensor unit 602 includes a tire pressure sensor 622P (FIG. 7) screwed on in place of a valve stem cap of a respective tire 620, and is configured to measure tire pressure of the respective tire 620 directly. Alternatively, in some embodiments, each sensor unit 602 includes at least one of a wheel speed sensor, an accelerometer 622A, and/or a MEMS microphone 622B (shown in FIG. 7), and is configured to measure the rate of revolution of a respective wheel. The rate of the revolution is compared with the expected rate corresponding to the vehicle speed of the vehicle 600 to determine whether the respective tire 620 is underinflated, overinflated, or properly inflated. For example, when the rate of the revolution of the respective wheel is faster than the target wheel rate corresponding to the current vehicle speed, the ECU 606 of the vehicle determines that the respective tire 620 is underinflated, and controls the tire pressure indicator 608 to indicate that the respective tire 620 is underinflated. In some embodiments, a sensor unit 602 includes a micro-electromechanical system (MEMS) microphone device that is configured to measure vibrations at the tire 620. The recorded vibrations can be analyzed to determine the condition of the road and detect changes in the road condition.

In some embodiments, each sensor unit 602 includes a respective sensor 622, an analog-to-digital converter (ADC) 624, a sensor controller 626, a wireless transceiver 628, and a power source 630 (e.g., including a battery and an associated voltage regulator). The respective sensor 622 of each sensor unit 602 is configured to measure an analog sensor signal 632 associated with tire pressure of a respective tire 620 and/or vibrations experienced at a respective tire 620, and the ADC 624 is configured to sample and digitalize the analog sensor signal 632 based on a sampling rate (e.g., 1 KHz) to generate a temporal sequence of sensor data samples 634. Under some circumstances, the wireless transceiver 628 is coupled to the wireless communication link 612, and configured to transmit the temporal sequence of sensor data samples 634 to the ECU 606 via at least the wireless communication link 612. Further, in some embodiments, each sensor unit 602 further includes a frontend signal processor 636 coupled to the ADC 624. The frontend signal processor 636 is configured to process the temporal sequence of sensor data samples 634 to generate one or more output data items 638. The wireless transceiver 628 is configured to transmit the one or more output data items 638 to the ECU 606 via at least the wireless communication link 612. As such, the one or more output data items are transmitted continuously to the tire monitor receiver 604 while the measured sensor data samples 634 are not transmitted directly to the tire monitor receiver 604, thereby reducing the amount of data transmitted to the tire monitor receiver 604. For example, the tire monitor receiver 604 may continuously receive updates on the currently detected road condition (e.g., snowy, dry, or wet). In some embodiments, the wireless transceiver 628 only transmits data to the tire monitor receiver 604 when a change is detected (e.g., consecutive output data items are non-consistent). For example, the tire monitor receiver 604 may receive a signal or alert only when a change in road condition is detected (e.g., the road condition is now wet).

Additionally, in some embodiments, the frontend signal processor 636 of each sensor unit 602 includes a neural network circuit (NNC) 640 that implements a neural network 4200 (e.g., a CNN, a recurrent neural network (RNN), a transformer, and an autoencoder. The neural network circuit 640 is configured to generate the one or more output date items 638 including a condition indicator of a component of the vehicle 600. In some embodiments, the one or more output date items 638 correspond to embeddings generated by the neural network 200 based on the sensor data samples 634. In some embodiments, the neural network circuit 640 includes a plurality of operational amplifiers 424 and a plurality of resistors 440 (FIG. 4). Each amplifier 424 forms a respective neuron circuit 400 with a subset of resistors 440 to implement a respective neuron of the neural network 200. Resistances of the plurality of resistors 440 depend on weights associated with neuron inputs of the respective neuron of the neural network 200. More details on implementing the neural network 200 using analog circuit are explained above with reference to FIGS. 1A-5.

In some embodiments, a sensor unit 602 of the tire sensor system 610 includes a sensor (such as a three-axis accelerometer and/or a MEMS microphone) configured to measure motion data samples 634 and/or determine an acceleration. The accelerometer and/or the MEMs microphone is used as a vibration sensor for collecting vibration data that is determined based the motion data samples 634 and associated acceleration. The motion data samples 634 are further used to activate another pressure sensor or other functions of the vehicle 600. In some embodiments, the vibration data are used to determine a type and a condition of a road on which the vehicle 600 is driven. In some embodiments, the vibration data are used to monitor a condition of the vehicle 600 and associated components, including a structural integrity of a tire, a condition of a tire tread, and wear or loss of wheel bolts. Additionally, in some embodiments, the vibration data are transmitted continuously to the tire monitor receiver 604 having an antenna in an autonomous sensor node. Alternatively, the vibration data are processed by the neural network circuit 640 that is disposed in proximity to the sensor. The neural network circuit 640 is configured to determine the one or more output data items 638 indicating a road condition, a vehicle condition, and/or a condition of a component of the vehicle 600 (e.g., a tire condition).

In some embodiments, a sensor unit 602 of the tire sensor system 610 includes a tire pressure sensor configured to measure tire pressure data samples 634 directly. The tire pressure data samples 634 are used to determine a condition of a road, the vehicle 600, or associated components. The condition includes one or more of: a type and a condition of a road on which the vehicle is driven, a structural integrity of a tire, a condition of a tire tread, and wear or loss of wheel bolts. Additionally, in some embodiments, the tire pressure data samples 634 are transmitted continuously to the tire monitor receiver 604 having an antenna in an autonomous sensor node. Alternatively, in some embodiments, the tire pressure data samples 634 are processed by the neural network circuit 640 and converted to one or more output data items 638 indicating a road condition, a vehicle condition, and/or a condition of a component of the vehicle (e.g., a tire condition). The component of the vehicle is one or more of: a wheel hub, a suspension elements, springs, a shock absorber, and a frame. Any vibration caused by movement and moving parts of the vehicle 600 has a definite imprint (character). An imprint change is optionally determined by vibration transmitted to the wheel and then being detected by the tire pressure sensor of the sensor unit 602 of the tire sensor system 610.

Figure 7:
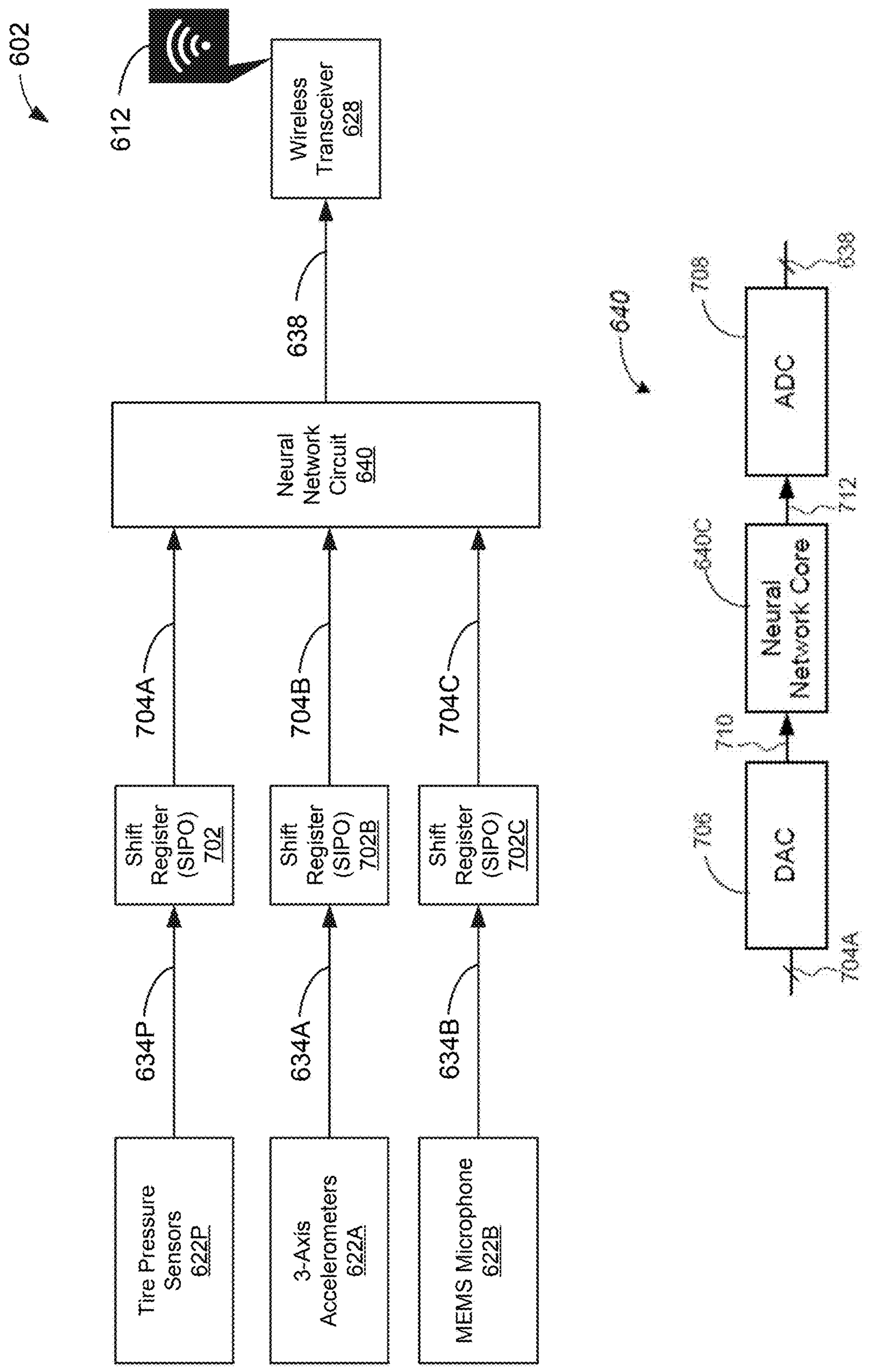
FIG. 7 is a block diagram of an example sensor unit of a tire sensor system of a vehicle including a neural network circuit, according to some embodiments.

FIG. 7 is a block diagram of an example sensor unit 602 of a tire sensor system 610 of a vehicle 600 including a neural network circuit 640, according to some embodiments. The sensor unit 602 generates one or more output data items 638 associated with a condition associated with the vehicle 600 for transmission to, and further processing by, an ECU 606 (FIG. 6), thereby avoiding continuously streaming a temporal sequence of sensor data samples 634 requiring a higher data rate than the output data items 638. The sensor unit 602 includes a sensor 622, which collects a temporal sequence of sensor data samples 634. The sensor unit 602 is physically coupled to a tire 620 of a vehicle 600, and includes one or more of: tire pressure sensors 622P, 3-axis accelerometers 622A, and MEMS microphones 622B. A shift register 702 is coupled to the sensor 622 and converts the temporal sequence of sensor data samples 634 into a plurality of first parallel data items 704A. In some embodiments, the sensor unit 602 further includes a plurality of latches (not shown) coupled to the shift register 702 and configured to hold the plurality of first parallel data items 704A concurrently. The plurality of first parallel data items 704A are applied on a plurality of first inputs of the neural network circuit 640. The neural network circuit 640 generates the one or more output data items 638 based on the plurality of first parallel data items 704A, and the one or more output data items 638 indicate the condition of a road where the vehicle 600 operates, the vehicle 600, and/or a component of the vehicle 600.

In some embodiments, the temporal sequence of sensor data samples 634 includes a temporal sequence of pressure data samples 634P collected by the tire pressure sensor 622P. In some embodiments, the accelerometer 622A collects a temporal sequence of motion data samples 634A, and a shift register 702B converting the temporal sequence of motion data samples 634A into a plurality of second parallel data items 704B. In some embodiments, the sensor unit 602 further includes a plurality of second latches (not shown) coupled to the shift register 702B and configured to hold the plurality of second parallel data items 704B concurrently. The plurality of second parallel data items 704B are applied on a plurality of second inputs of the neural network circuit 640. The one or more output data items are 638 generated based on both the second parallel data items 704B and the first parallel data items 704A. In some embodiments, the microphone 622B collects a temporal sequence of motion data samples 634B, and a shift register 702C converts the temporal sequence of motion data samples 634B into a plurality of third parallel data items 704C. In some embodiments, the sensor unit 602 further includes a plurality of third latches (not shown) coupled to the shift register 702C and configured to hold the plurality of third parallel data items 704C concurrently. The plurality of third parallel data items 704C are applied on a plurality of third inputs of the neural network circuit 640. The one or more output data items are 638 generated based on any of: the third parallel data items 704C, the second parallel data items 704B and/or the first parallel data items 704A.

Stated another way, in some embodiments, only the temporal sequence of pressure data samples 634P collected by the tire pressure sensor 622P are processed by the neural network circuit 640 to generate the one or more output data items 638. Alternatively, in some embodiments, only the temporal sequence of motion data samples 634A collected by the accelerometers 622A are processed by the neural network circuit 640 to generate the one or more output data items 638. Alternatively, in some embodiments, only the temporal sequence of motion data samples 634B collected by the microphones 622B are processed by the neural network circuit 640 to generate the one or more output data items 638. Alternatively and additionally, in some embodiments, a combination of the pressure data samples 634P and the motion data samples 634A and/or 634B is processed by the neural network circuit 640 to generate the one or more output data items 638.

Further, in some embodiments, the neural network circuit 640 includes a digital-to-analog converter (DAC) 706, a neural network core 640C, and an ADC 708. The DAC 706 is configured to receive the plurality of first parallel data items 704A via the plurality of first inputs and convert the plurality of first parallel data items 704A to a plurality of analog input signals 710. The neural network core 640C is coupled to the DAC 706 and is configured to convert the plurality of analog input signals 710 to one or more analog output signals 712. The ADC 708 is coupled to the neural network core 640C, and configured to convert the one or more analog output signals 712 to the one or more output data items 638. In some embodiments, the one or more output data items 638 include a parallel data item. Further, in some embodiments, the parallel data item is serialized before it is transmitted by the wireless transceiver 628 and communicated via the wireless communication link 612.

In some embodiments, the neural network circuit 640 includes a neuromorphic analog signal processor (NASP), which is configured to process raw sensor signals captured by a sensor 622 (e.g., including a tire pressure sensor, a 3-axis, accelerometer, or both). A neural network 200 includes artificial neurons that perform computations and axons connecting the neurons based on weights between the nodes, and the neural network circuit 640 implements the neural network 200 using circuitry elements. Referring to FIG. 4, in some embodiments, neurons of the neural network 200 are implemented with operational amplifiers 424, and axons and associated weights are implemented using weight resistors 440. In some embodiments, the neural network circuit 640 includes an in-memory design scheme in which each neuron is connected to each neighboring neuron. Conversely, in some embodiments, the neural network circuit is implemented using a sparse neural network scheme having only necessary axons connecting neurons required for inference, thereby simplifying corresponding chip layout. In an example, the neural network circuit 640 applies the sparse neural network scheme to realize one of a CNN, an RNN, a transformer, and an autoencoder, where connections are sparse (e.g., less than a predefined number of connections per neuron).

In some embodiments, the neural network 200 is trained and/or optimized by software programs, and converted to circuit schematics and layouts that are further realized on an electronic chip by semiconductor manufacturing technology. An area utilization rate of the electronic chip can be close to, or reach, 100% under some circumstances. In an example, weights of the neural network 200 are realized with an 8-bit accuracy level on the electronic chip. By these means, the neural network circuit 640 yields a fast time to market with desirable neural network performance, while having no or little risk of technical failure. Furthermore, in some embodiments, the NASP includes a hybrid core, similar to that described in the latest neuroscientific works on human brain data processing.

In some embodiments, the tire pressure sensors 622P, the three-axis accelerometers 622A, or the MEMS microphones 622B of the sensor unit 602 are attached to vehicle wheels and configured to collect the sensor data samples 634P, 632A, or 634B continuously at a sampling rate. In some embodiments, a stream of sensor data samples 634 is generated and transferred wirelessly to analytic equipment (e.g., tire monitor receiver 604 in FIG. 6). This sensor data stream demands power consumption from a battery of a power source 630 of the sensor unit 602 continuously, and may shorten a life span of the battery. Conversely, in some embodiments, the neural network circuit 640 is disposed in proximity to the tire pressure sensors 622P, the three-axis accelerometers 622A, or the MEMS microphones 622B locally on each sensor node, and is configured to convert the stream of sensor data samples 634P, 634A, or 634B, e.g., in each time window, to one or more output data items 638. The one or more output data items 638 associated with each time window is transferred wirelessly to the analytic equipment (e.g., tire monitor receiver in FIG. 6) in place of the stream of sensor data samples 634. In an example, the neural network circuit 640 is based on an encoder-decoder neural network. A wireless communication link 612 (FIG. 6) established in accordance with one of a Bluetooth Low Energy (BLE) protocol and a low power device 433 MHZ (LPD433) protocol. The one or more output data items 638 include embeddings extracted from the stream of sensor data samples 634, and transmitted via the wireless communication link 612. Compared with the sensor data samples 634, a size of the output data items 638 transferred via the wireless communication link 612 is reduced by up to 1000 times.

In some embodiments, the neural network 200 realized by the neural network circuit 640 includes an autoencoder configured to generate embeddings. The embeddings may identify a new class describing the stream of sensor data samples having a new data pattern, although the autoencoder is trained to identify a plurality of sensor data patterns that does not include the new data pattern. The neural network circuit 640 is configured to generate the one or more output data items 638 representing the embeddings outputted by the corresponding neural network 200. The one or more output data items 638 correspond to sensor data samples 634 associated with a range of different vibration signals that are provided by the tire sensor system 610 having built-in vibration sensors (e.g., accelerometers 622A, microphones 622B, and/or tire pressure sensors 622P). In some embodiments, the one or more output data items 638 are further analyzed by a digital system (e.g., ECU 606 in FIG. 6) to determine a condition of a road surface and/or a tire. In some embodiments, the sampling rate of the stream of sensor data samples 634 is equal to 20 kHz, and the different vibration signals from which the sensor data samples 634 are generated have a frequency spectrum up to 10 kHz, thereby allowing the neural network circuit 640 to process the sensor data samples 634 in real time. More specifically, the embeddings generated by the neural network circuit 640 are transferred to the ECU 606 via the tire monitor receiver 604 in real time while the stream of sensor data samples 634 are collected by the sensor system 602. The embeddings have a smaller size than the stream of sensor data samples 634 by a number of orders, and can be transmitted to the ECU 606 with relatively low power consumption.

Figures 8A, 8B, 8C:
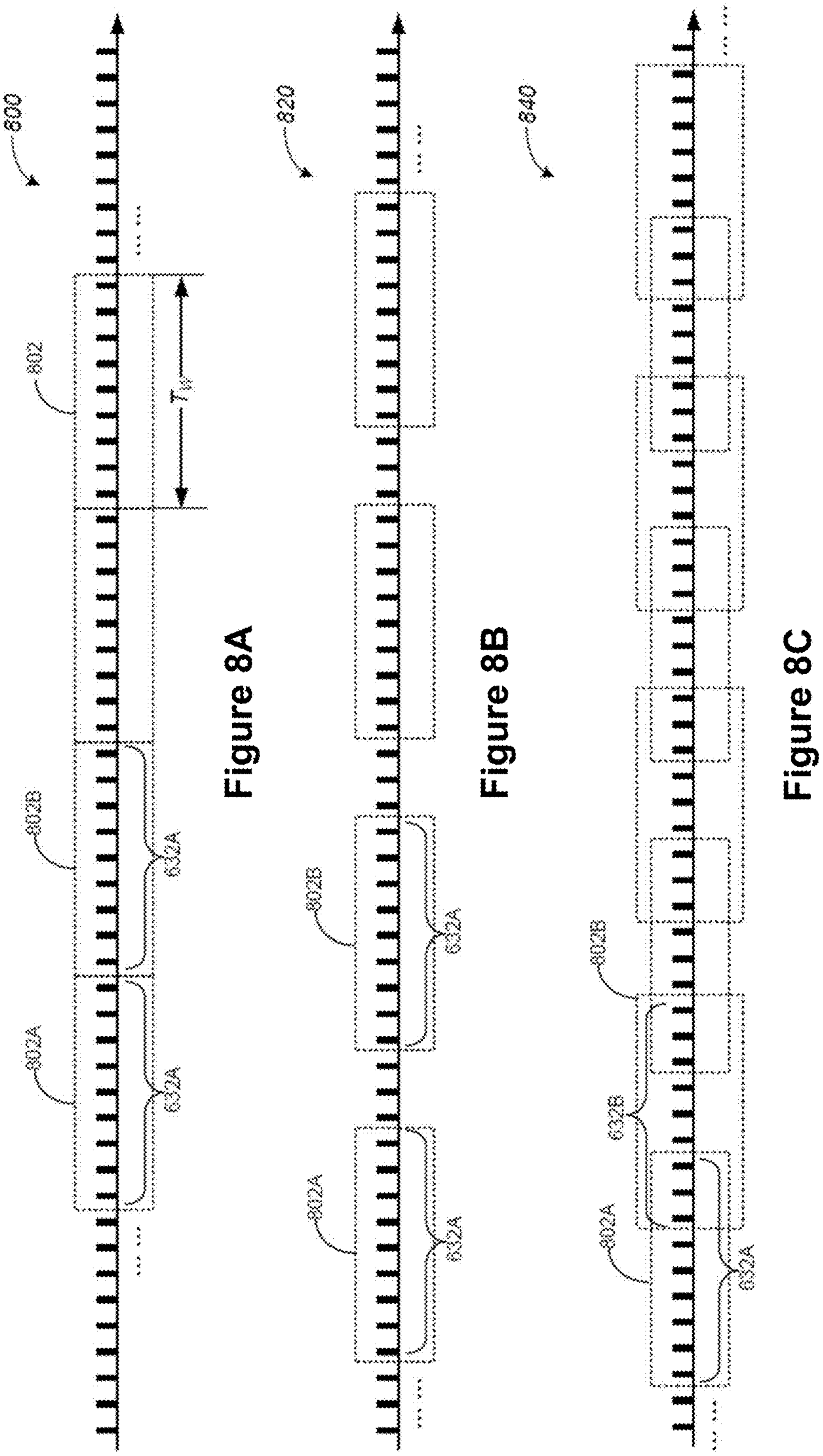
FIGS. 8A-8C are diagrams illustrating three temporal window schemes in which sensor data samples are processed by a neural network circuit, according to some embodiments.

FIGS. 8A-8C are diagrams illustrating three temporal window schemes 800, 820, and 840 in which sensor data samples 634 are processed by a neural network circuit 640, according to some embodiments. For each temporal window scheme 800, 820, or 840, the sensor data samples 634 are continuously recorded according to a sampling frequency $f_S$, and grouped according to a plurality of temporal windows 802. A temporal sequence of the sensor data samples 634 in each temporal window 802 is processed by the neural network circuit 640 to update the one or more output data items 638 once. In some embodiments, the plurality of temporal windows 802 includes a first temporal window 802A. A first temporal sequence of sensor data samples 634A is measured by a sensor unit 602 according to the sampling rate $f_S$ and included within a first temporal window 802. The first temporal window 802A has a temporal width $T_W$. In an example, the sampling rate $f_S$ is 10 or 20 KHz, and the first temporal window 802A is 0.01 second and includes 100 or 200 sensor data samples 634. The one or more output data items 638 is determined and updated based on the sensor data samples measured in the first temporal window 802.

In some embodiments, a second sequence of sensor data samples 634B are collected during a second temporal window 802B, and the second temporal window 802B immediately follows the first temporal window 802A. After being generated based on the first sequence of sensor data samples 634A, the one or more output data items 638 are determined and updated based on the second sequence of sensor data samples 634B. Further, referring to FIG. 8A, in some embodiments, a last sample of the first temporal window 802A immediately precedes a first sample of the second temporal window 802B. The one or more output data items 638 are updated based on an updated frequency $f_U$ that depends on the temporal width $T_W$ of the temporal windows 802 or a number of samples in each temporal window 802. For example, each temporal window 802 includes 100 sensor data samples 634, and the sampling rate $f_S$ is 10 KHz. The updated frequency $f_U$ of the one or more output data items 638 is 100 Hz, which is significantly lower than the sampling rate $f_S$. If a size of the one or more output data items 638 is less than a total size of 100 sensor data samples 634, transmission of the output data items 638 can conserve a bandwidth of a wireless communication link 612 as well as power consumption of the sensor unit 602.

Alternatively, referring to FIG. 8B, in some embodiments, a last sample of the first temporal window 802A is separated from a first sample of the second temporal window 802B by at least one sample. The updated frequency $f_U$ of the one or more output data items 638 depends on a number of samples between the windows 802A and 802B in addition to the temporal width $T_W$ of the temporal windows 802 or a number of samples in each temporal window 802. For example, each temporal window 802 includes 100 sensor data samples 634 and is separated by 10 sensor samples from a subsequent temporal window 802, and the sampling rate $f_S$ is 10 KHz. The updated frequency $f_U$ of the one or more output data items 638 is 90.9 Hz.

Alternatively, referring to FIG. 8C, in some embodiments, the first temporal window 802A partially overlaps the second temporal window 802B by a number of samples. The updated frequency $f_U$ of the one or more output data items 638 depends on the number of samples belong to both of the windows 802A and 802B in addition to the temporal width $T_W$ of the temporal windows 802 or a number of samples in each temporal window 802. For example, each temporal window 802 includes 100 sensor data samples 634 and overlaps with a subsequent temporal window 802 by 10 sensor samples, and the sampling rate $f_S$ is 10 KHz. The updated frequency $f_U$ of the one or more output data items 638 is 111.1 Hz.

Figure 9:
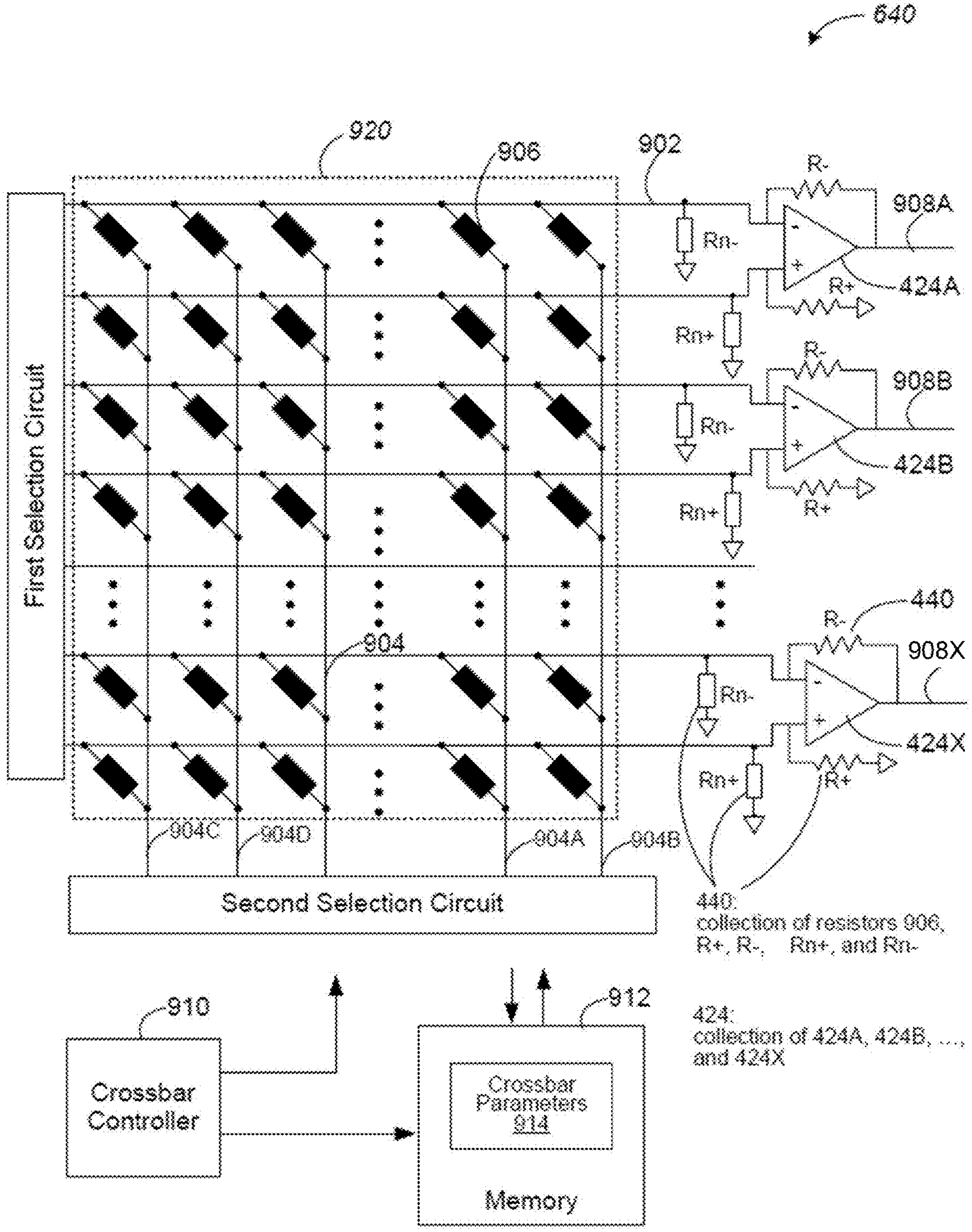
FIG. 9 is a schematic diagram of a neural network circuit formed based on a crossbar array of resistors, according to some embodiments.

FIG. 9 is a schematic diagram of a neural network circuit 640 formed based on a crossbar array of resistors, according to some embodiments. In some embodiments, the neural network circuit 640 includes a plurality of operational amplifiers 424 (e.g., 424A, 424B, . . . , 424X) and a plurality of resistors 440 (FIG. 4). Each amplifier 424 forms a respective neuron circuit 400 with a subset of resistors 440 to implement a respective neuron of a neural network 200 corresponding to the neural network circuit 640. Resistances of the plurality of resistors 440 depend on weights associated with neuron inputs of the respective neuron of the neural network 200. Further, in some embodiments, the neural network circuit 640 is formed based partially on a crossbar array of resistive elements 920 having a plurality of word lines 902, a plurality of bit lines 904, and a plurality of resistive elements 906. Each resistive element 906 is located at a cross point of, and electrically coupled between, a respective word line 902 and a respective bit line 904. Additionally, in some embodiments, a crossbar controller 910 extracts crossbar parameters 914 stored in memory 912, and controls the crossbar array of resistive elements 920 to provide the weight resistors 440 of the neuron circuits 400 of the neural network circuit 640 based on the crossbar parameters 914, where the crossbar parameters 914 correspond to weights of the neural network 200 that has been trained.

In some embodiments, a first subset of the plurality of operational amplifiers 424 (e.g., 424A and 424B) corresponds to a first layer, and a second subset of the plurality of operational amplifiers (e.g., including 424X) corresponds to a second layer that follows the first layer. Outputs (e.g., 908A and 908B) of the first subset of the plurality of operational amplifiers 424 are fed into a set of bit lines (e.g., 904A and 904B) coupled to inputs of the second subset of the plurality of operational amplifiers 424 (e.g., including 424X). Further, in some embodiments, the first layer includes an input layer of a corresponding neural network 200, and a set of bit lines (e.g., 904C and 904D) coupled to inputs of the first subset of the plurality of operational amplifiers 424 (e.g., 424A and 424B) are configured to receive the parallel data items 704A associated with the sensor data samples 634P. Alternatively, in some embodiments, the second layer includes an output layer of a corresponding neural network 200. Outputs (e.g., 908X) of the second subset of the plurality of operational amplifiers 424 provide one or more output data items 638 of the neural network circuit 640 to be transmitted to an ECU 606 (FIG. 6) via a wireless communication link 612.

In some embodiments, the crossbar array of resistive elements 920 includes one of: a crossbar array of NOR memory cells, a crossbar array of phase-change memory (PCM) memory cells, or a crossbar array of magnetoresistive memory cells. Each resistive element 906 includes one of: a NOR memory cell, a PCM memory cell, or a magnetoresistive memory cell.

Figure 10:
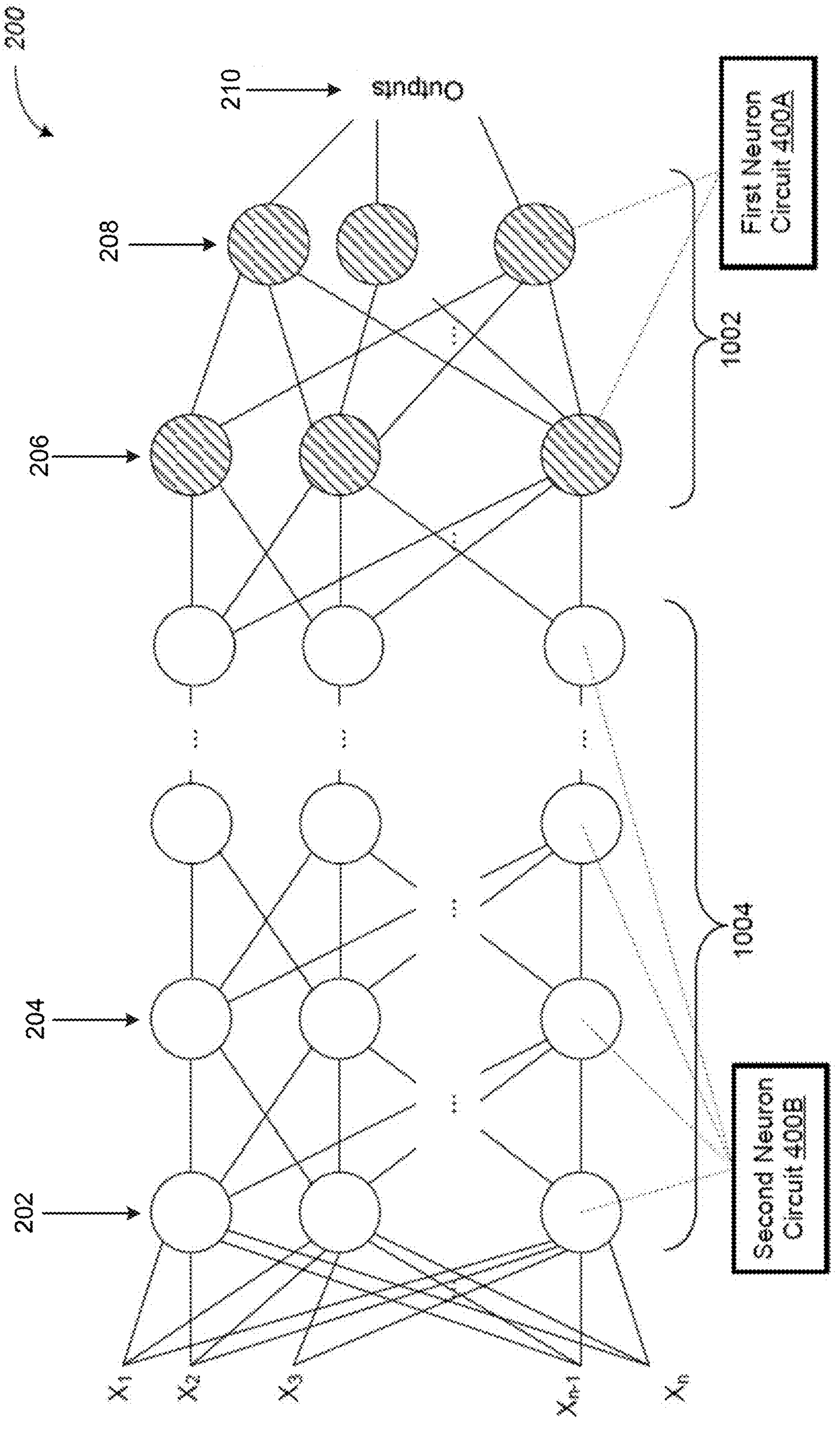
FIG. 10 is a structural diagram of a neural network having adjustable weights in one or more layers, according to some embodiments.

FIG. 10 is a structural diagram of a neural network 200 having adjustable weights in one or more layers 1002 coupled to outputs 210 of the neural network, according to some embodiments. The neural network 200 is implemented by a neural network circuit 640 (FIGS. 6, 7, and 9). The neural network circuit 640 includes a plurality of operational amplifiers 424 and a plurality of resistors 440 (FIG. 4). Each amplifier 424 forms a respective neuron circuit 400 with a subset of resistors 440 to implement a respective neuron of the neural network 200 corresponding to the neural network circuit 640. Resistances of the plurality of resistors 440 depend on weights associated with neuron inputs of the respective neuron of the neural network 200. In some embodiments, a subset of the plurality of resistors 440 are variable resistors configured to implement the one or more layers 1002 having the adjustable weights. Resistances of the variable resistors are adjusted adaptively for the sensor system 602 of the vehicle 600 (FIG. 6). Further, in some embodiments, the one or more layers 1002 include a plurality of successive layers (e.g., 2 layers) that are coupled to an output 210 of the neural network 200. In some embodiments, the neural network 200 has a total number of neural layers, and the one or more layers 1002 have a first number of layers. A ratio of the first number and the total number is less than a threshold portion (e.g., 10%). That said, less than the threshold portion of all neural layers of the neural network 200 are implemented based on variable resistors.

In some embodiments, the neural network 200 has one or more first layers 1002 having adjustable weights and one or more second layers 1004 having fixed weights. The adjustable weights of the one or more first layers 1002 are adjusted after the neural network 200 is retrained or used in different situations. The neural network circuit 640 corresponding to the neural network 200 includes a plurality of first neuron circuits 400A and a plurality of second neuron circuits 400B. The first neuron circuits 400A and the second neuron circuits 400B correspond to neurons of the one or more first layers 1002 and the one or more second layers 1004 of the neural network 200, respectively. The weight resistors 440 of the second neuron circuits 400B are fixed, and at least a subset of the weight resistors 440 of the first neuron circuits 400A are adjustable, such that the neural network circuit 400 is usable after the neural network 200 is retrained or used in different situations (e.g., for individual tires). Further, in some embodiments, the plurality of first neuron circuits 400A form one or more first successive layers including an output layer 208 of the corresponding neural network 200. The plurality of second neuron circuits 400B form one or more second successive layers including an input layer 202 of the corresponding neural network 200. The second and first successive layers may be applied for data pattern detection and interpretation/classification, respectively. In some embodiments, the one or more second layers 1004 include 80-90% of all layers of the neural network 200, and the one or more first layers 1002 include remaining 10-20% of all layers of the neural network 200.

In some embodiments, the neural network 200 is trained for more than hundreds of cycles (also known as epochs). After a predefined number of cycles (e.g., 200 cycles), weights of the one or more second layers 1004 are fixed, and weights of the one or more first layers 1002 continue to be adjusted. Stated another way, in some embodiments, the one or more first layers 1002 and the one or more second layers 1004 are identified in accordance with a determination whether their associated weights are fixed after the predefined of cycles during a training process. This property is also used in a transfer learning technique. As such, the stream of sensor data sample 634 (FIG. 6) are processed by a combination of a fixed neural network portion 1004 associated with pattern detection and a flexible neural network portion 1002 associated with pattern interpretation or classification.

In some embodiments not shown, the neural network circuit 640 corresponding to the neural network 200 includes a fixed neuromorphic analog core configured to generate the one or more output data items 638 (e.g., corresponding to embeddings). The fixed neuromorphic analog core 1004 consumes substantially low power that is below a threshold power level and has a substantially low latency that is below a latency threshold. The neural network circuit 640 further includes, or is coupled to, a fully flexible digital core configured to classify the one or more output data items. The fully flexible digital core is optionally included in the ECU 606 of the vehicle 600 (FIG. 6).

Figure 11:
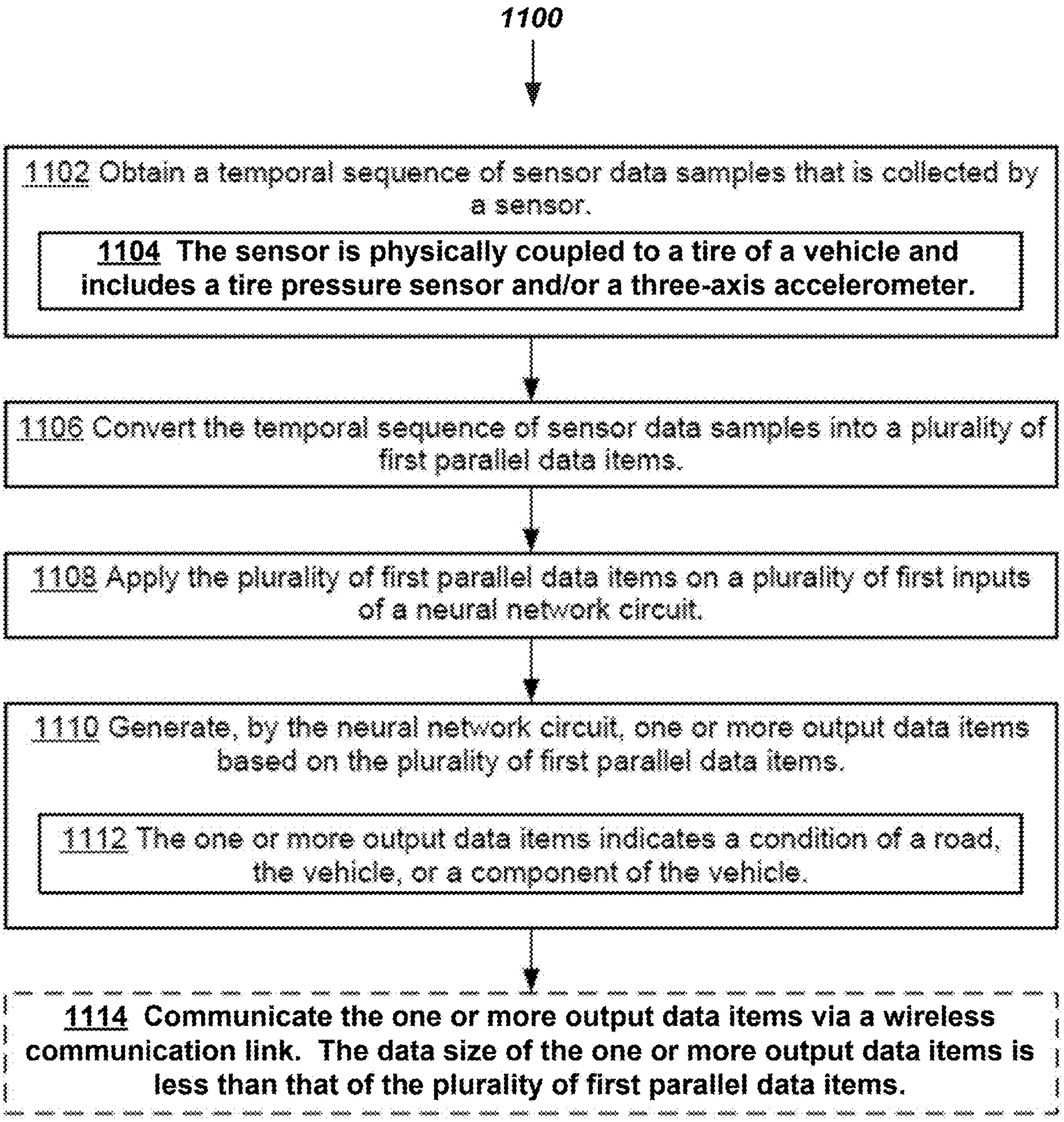
FIG. 11 is a flow diagram of a method of processing vehicle data, according to some embodiments.

FIG. 11 is a flow diagram of a method 1100 of implementing a tire pressure monitoring system of a vehicle based on a neural network circuit 640, according to some embodiments. An electronic device (e.g., a sensor unit 602 in FIG. 6) obtains (operation 1102) a temporal sequence of sensor data samples 634 that are collected by a sensor 622. The sensor 622 is physically coupled (operation 1104) to a tire 620 of a vehicle 600 (FIG. 6) and includes a tire pressure sensor 622P, a three-axis accelerometer 622A, and/or a MEMS microphone 622B. The temporal sequence of sensor data samples 634 is converted (operation 1106) into a plurality of first parallel data items 704A (FIG. 7), which are further applied (operation 1108) on a plurality of first inputs of a neural network circuit 640 (FIG. 7). The neural network circuit 640 generates (operation 1110) one or more output data items 638 based on the plurality of first parallel data items 704A. The one or more output data items 638 indicate (operation 1112) a condition of a road, the vehicle 600, or a component of the vehicle 600. In some embodiments, the one or more output data items 638 are communicated (operation 1114) via a wireless communication link 612 (FIG. 7), and a data size of the one or more output data items 638 is smaller than that of the plurality of first parallel data items 704A. Further, in some embodiments, the wireless communication link 612 is established in accordance with one of a Bluetooth Low Energy (BLE) protocol and a low power device 433 MHz (LPD433) protocol.

In some embodiments, the component of the vehicle 600 is a wheel hub, a suspension element, a shock absorber, or a frame.

In some embodiments, the temporal sequence of sensor data samples 634 include a temporal sequence of pressure data samples 634P collected by the tire pressure sensor 622P. The electronic device obtains a temporal sequence of motion data samples 634A that is collected by the three-axis accelerometer 622A of the vehicle 600, and converts the temporal sequence of motion data samples 634A into a plurality of second parallel data items 704B. The plurality of second parallel data items 704B is applied on a plurality of second inputs of the neural network circuit 640. The one or more output data items 638 are generated based on both the second parallel data items 704B and the first parallel data items 704A.

In some embodiments, the electronic device obtains a temporal sequence of motion data samples 634B that are collected by the MEMS microphone 622B of the vehicle 600 and converts the temporal sequence of motion data samples 634B (e.g., vibration data) into a plurality of third parallel data items 704B. The plurality of third parallel data items 704B is applied on a plurality of third inputs of the neural network circuit 640. The one or more output data items 638 are generated based at least in part on third parallel data items 704C.

In some embodiments, the electronic device measures the temporal sequence of sensor data samples 634 within a first temporal window 802A (FIG. 8) having a temporal width $T_W$ and according to a sampling rate $f_S$. The one or more output data items 638 corresponds to the first temporal window 802A. Further, in some embodiments, the electronic device updates the one or more output data items 638 based on a second sequence of sensor data samples 634 that is collected during a second temporal window 802B. The second temporal window 802B immediately follows the first temporal window 802A. In some embodiments, a last sample of the first temporal window 802A immediately precedes a first sample of the second temporal window 802B. Alternatively, in some embodiments, a last sample of the first temporal window 802A is separated from a first sample of the second temporal window 802B by at least one sample. Alternatively, in some embodiments, the first temporal window 802A partially overlaps the second temporal window 802B by a number of samples.

In some embodiments, the electronic device includes a plurality of latches for holding the plurality of first parallel data items 704A concurrently. In some embodiments, the electronic device includes a wireless transceiver 628 (FIG. 6) coupled to the neural network circuit 640. The wireless transceiver is configured to transmit a wireless signal carrying the one or more output data items 638 over a wireless communication link 612.

In some embodiments, the electronic device includes a digital-to-analog converter (DAC) 706, a neural network core 640C coupled to the DAC, and an analog-to-digital converter (ADC) 708 coupled to the neural network core 640C (FIG. 7). The DAC 706 is configured to receive the plurality of first parallel data items 704A via the plurality of first inputs and convert the plurality of first parallel data items 704A to a plurality of analog input signals 710. The neural network core 640C is configured to convert the plurality of analog input signals 710 to one or more analog output signals 712. The ADC 708 is configured to convert the one or more analog output signals 712 to the one or more output data items 638.

In some embodiments, the neural network circuit 640 is configured to implement one of a convolutional neural network (CNN), a recurrent neural network (RNN), a transformer, and an autoencoder.

In some embodiments, the neural network circuit 640 further comprises a plurality of operational amplifiers 424 and a plurality of resistors 440. Each amplifier 424 forms a respective neuron circuit with a subset of resistors 440 to implement a respective neuron of a neural network. Resistances of the plurality of resistors 440 depend on weights associated with neuron inputs of the respective neuron of the neural network. Further, in some embodiments, at least a subset of the plurality of resistors 440 is selected from a crossbar array of resistive elements 906 (FIG. 9) having a plurality of word lines 902, a plurality of bit lines 904, and a plurality of resistive elements 906. Each resistive element 906 is located at a cross point of, and electrically coupled between, a respective word line 902 and a respective bit line 904.

In some embodiments, a subset of the plurality of resistors 440 are variable resistors 440 configured to implement one or more layers of the neural network 200. The electronic device adjusts resistances of the variable resistors 440 adaptively for the sensor of the vehicle 600. Further, in some embodiments, the one or more layers 1002 (FIG. 10) include a plurality of successive layers that is coupled to an output 210 of the neural network 200. In some embodiments, the neural network 200 has a total number of neural layers, and the one or more layers have a first number of layers. A ratio of the first number and the total number is less than a threshold portion.

In some embodiments, the neural network 200 corresponding to the neural network circuit 640 is trained to identify a plurality of sensor data patterns via the one or more output data items 638, and the one or more output data items 638 are generated to identify a new pattern of sensor data samples distinct from the plurality of sensor data patterns.

Figure 12A:
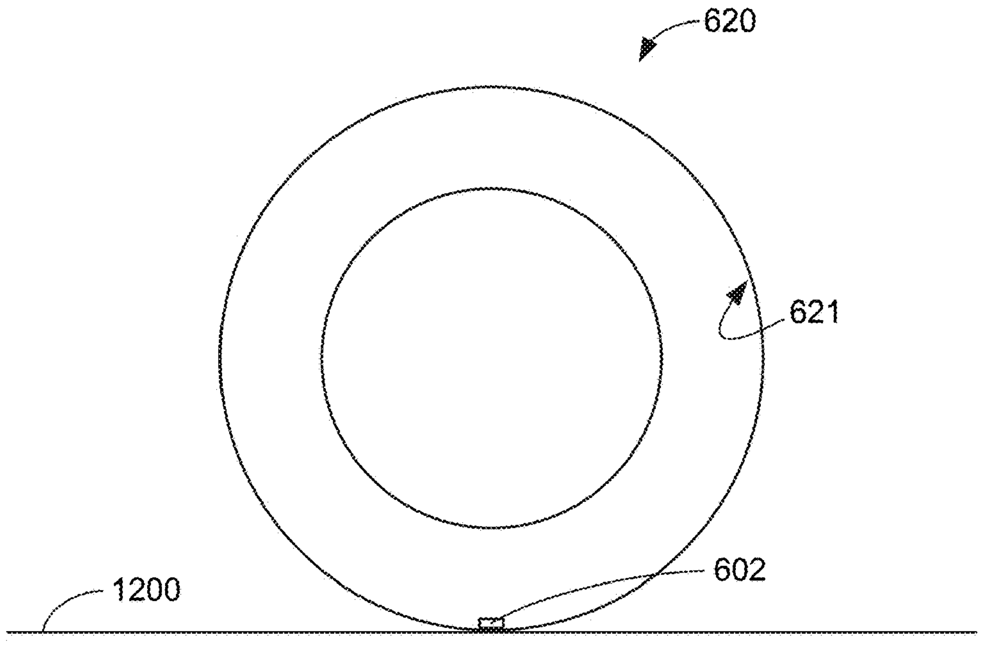
FIG. 12A shows a side view of an example tire that includes a tire sensor system, according to some embodiments.
Figure 12B:
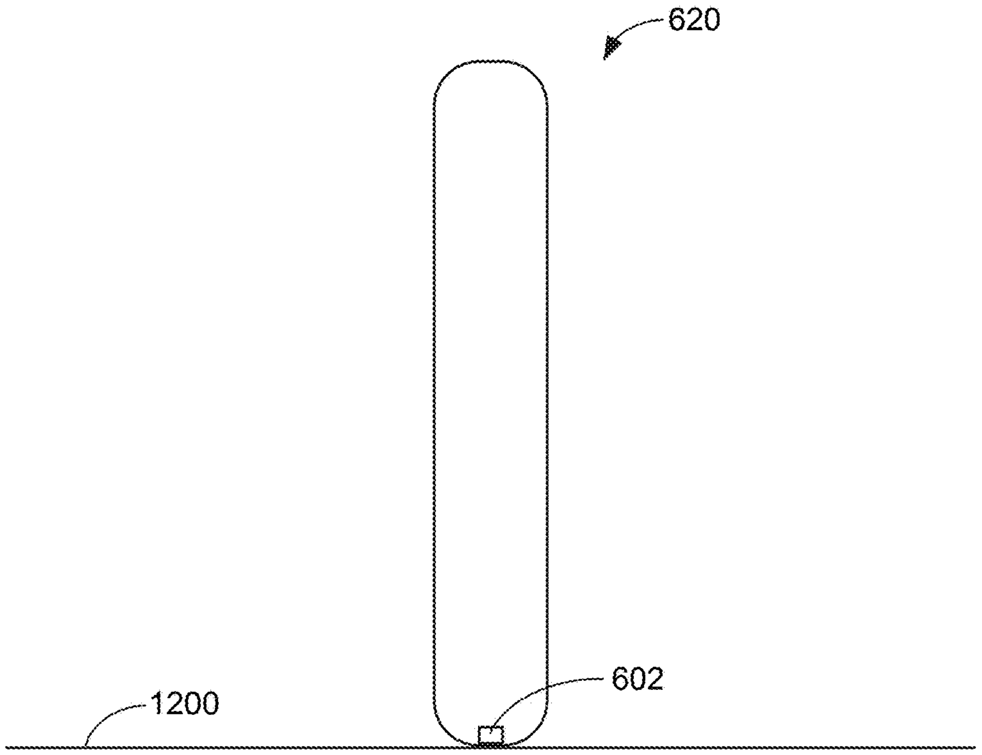
FIG. 12B shows a front view of the example tire and tire sensor system shown in FIG. 12A, according to some embodiments.
Figure 12C:
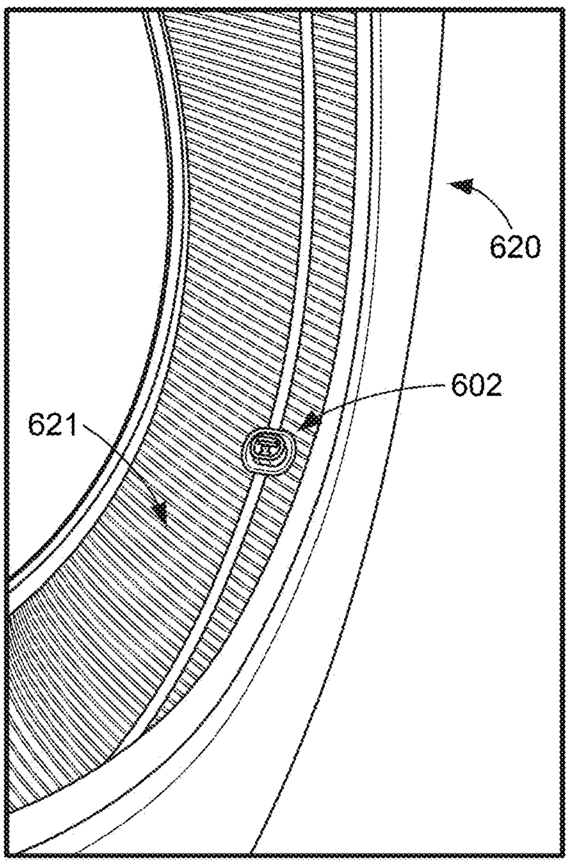
FIG. 12C shows a perspective view of an inner surface of the example tire with tire sensor system shown in FIG. 12A, according to some embodiments.
Figure 12D:
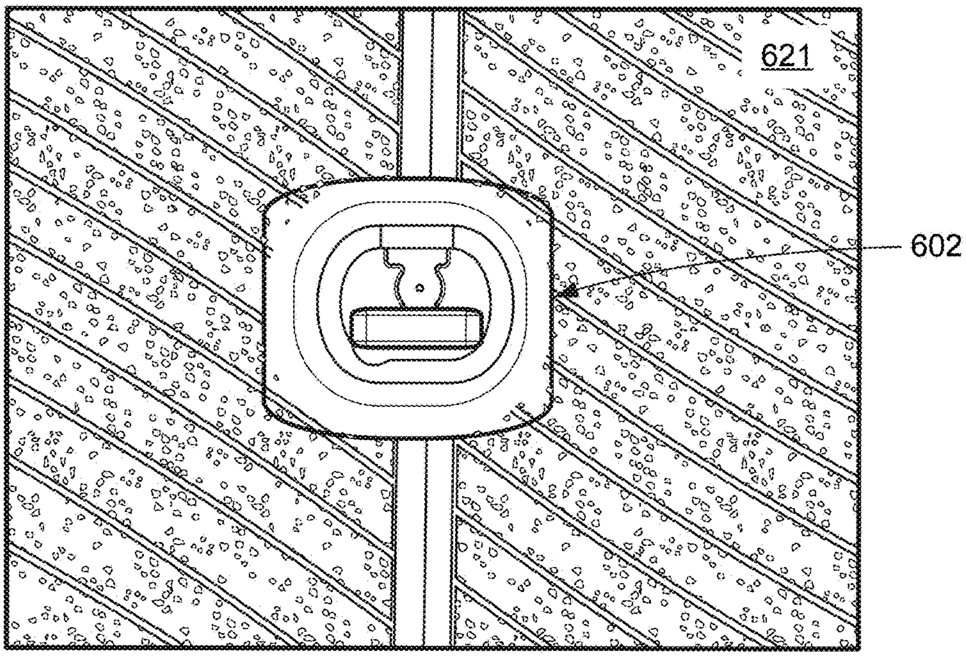
FIG. 12D shows a top view of a sensor disposed on an inner surface of the example tire shown in FIG. 12A, according to some embodiments.

FIGS. 12A-12D show the position of a sensor system 602 relative to an example tire 620 according to some embodiments. FIGS. 12A and 12B show a side view and a front view of the example tire 620 that includes a sensor system 602, respectively. FIG. 12C shows a perspective view of an inner surface of the example tire 620 that includes a tire sensor system 602, and FIG. 12D shows a top view of the sensor 602 disposed on an inner surface of the example tire 620. The tire 620 shown in each of FIGS. 12A-12D correspond to any of the tires 620A, 620B, 620C, 620D, or 620E shown in FIG. 6A. The tire 620 includes the sensor system 602 (corresponding to any of sensor systems 602A, 602B, 602C, 602D, or 602E shown in FIG. 6A).

In some embodiments, as shown in FIGS. 12A-12D, the sensor system 602 (including the microphone 622B) is disposed on an inner surface 621 (e.g., internal surface) of an outer ring of the tire 620 such that when the tire 620 is in contact with a road surface 1200, the tire material (e.g., tire rubber) is disposed between the sensor system 602 and the road surface 1200. This positioning allows the sensor system 602 to detect vibrations at the tire 620 due to conditions of the road surface 1200 without having direct contact with the road surface 1200 or bearing the weight of the tire 620 or the vehicle 600. In some embodiments, as shown, the sensor system 602 (including the microphone 622B) is disposed at a location on the tire 620 that experiences the most contact (e.g., the best contact, or the highest quality contact) with the road surface 1200. In some embodiments, as shown, the sensor system 602 is positioned substantially at a midpoint of the tire 620 (e.g., within any of 1 mm, 2 mm, 3 mm, 4 mm, 5 mm, 6 mm, 7 mm, 8 mm, 9 mm, 10 mm, 15 mm, 20 mm, 30 mm, 40 mm, 50 mm of a center of the tire 620).

Figure 13A:
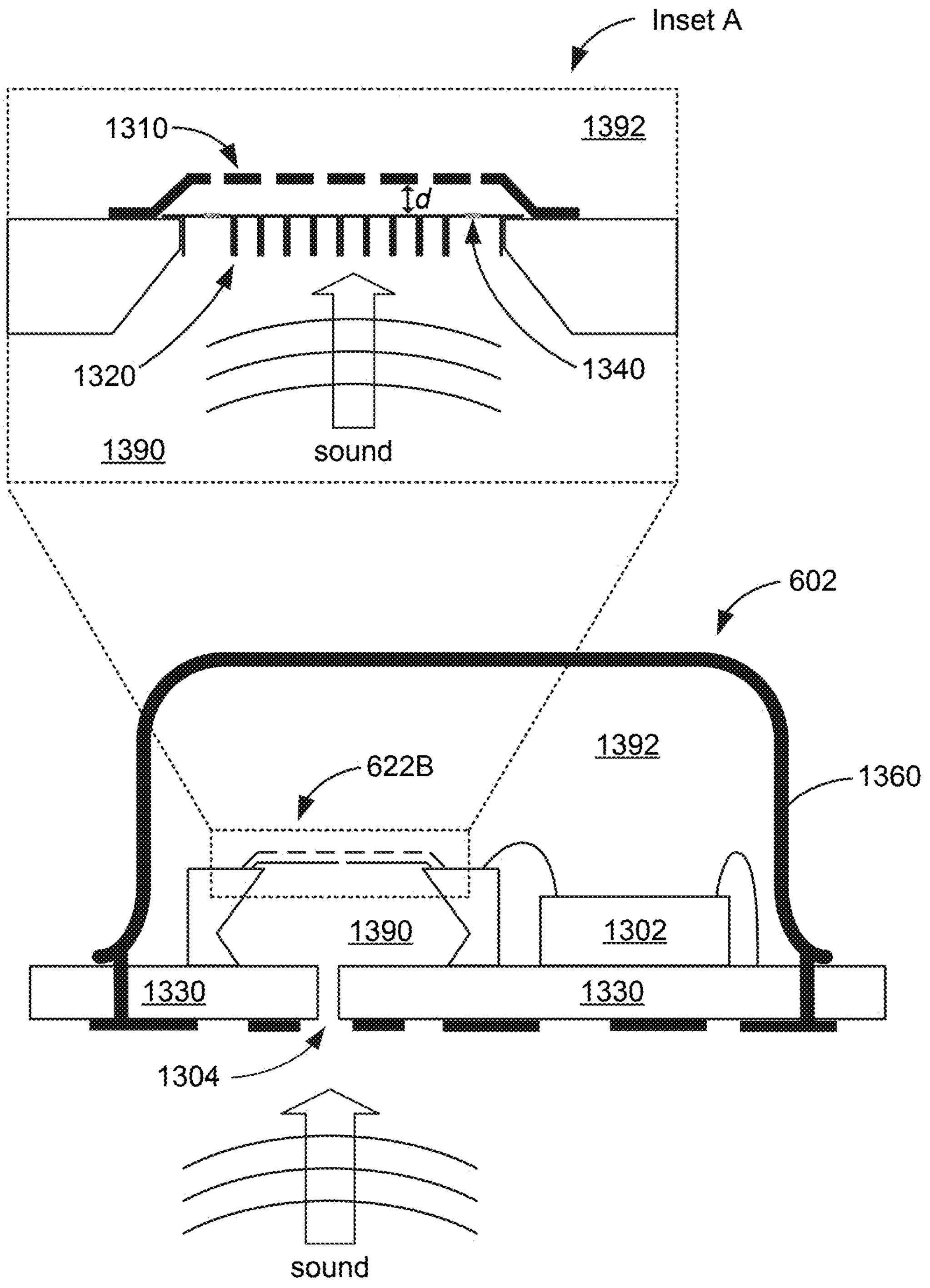
FIG. 13A illustrates an example sensor that includes a micro-electromechanical system microphone, according to some embodiments.

FIG. 13A illustrates an example sensor 602 that includes a micro-electromechanical system (MEMS) microphone 622B, according to some embodiments. In addition to the MEMS microphone 622B, the sensor 602 also includes a printed circuit board (PCB) 1330, on which the MEMS microphone 622B is mounted. In some embodiments, the sensor 602 also includes an application specific integrated circuit (ASIC) 1302 (e.g., neural network circuit 640) that is electrically connected to the MEMS microphone 622B and configured to receive and process electrical signals produced from the MEMS microphone 622B. In some embodiments, the ASIC 1302 is mounted on the PCB 1330. Alternatively, in some embodiments, the ASIC 1302 is mounted on a different PCB than PCB 1330 (e.g., PCB 1300 shown in FIGS. 13B and 13C).

The sensor 602 also includes an enclosure (e.g., housing) 1360 configured to environmentally isolate the MEMS microphone 622B from changes in air pressure within the tire 620 while still being sensitive to vibrations (e.g., mechanical vibrations) at the tire 620. In some embodiments, the PCB 1330 includes a hole 1304 that is configured to allow sound to enter a front chamber 1390 of the MEMS microphone 622B. Alternatively, in some embodiments, the housing 1360 itself includes a hole 1362 (instead of a hole 1304 in the PCB 1300), in which case, sound reaches the MEMS microphone 622B via a back chamber 1392 of the sensor 602.

As shown in Inset A, the MEMS microphone 622B includes an electrode 1310 and a membrane 1320 (also referred to as a piston). In some embodiments, the electrode 1310 is fixed in position (e.g., inflexible in comparison to the membrane 1320), and the membrane 1320 is a flexible membrane that can deform (e.g., bend) in response to sound waves being incident on the membrane 1320. As sound reaches the membrane 1320, the membrane 1320 can deform, causing the distance d between the membrane 1320 and the electrode 1310 to change, thereby generating a modulation (e.g., in voltage) in the electrical signal transmitted from the MEMS microphone 622B. In some embodiments, the membrane 1320 is attached via one or more springs 1340 that allow the membrane 1320 to move relative to the electrode 1310. In some embodiments, the electrode 1310 is a perforated electrode.

Figure 13B:
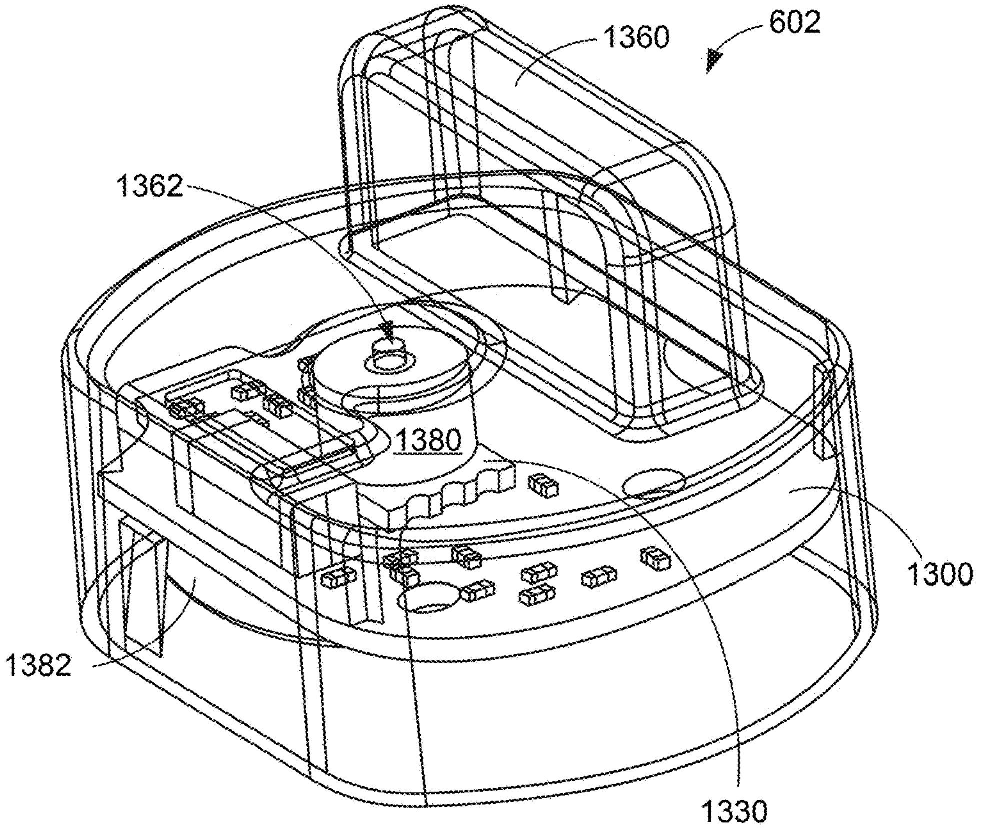
FIG. 13B illustrates an example of an environmentally isolated sensor that includes a micro-electrical system microphone, according to some embodiments.
Figure 13C:
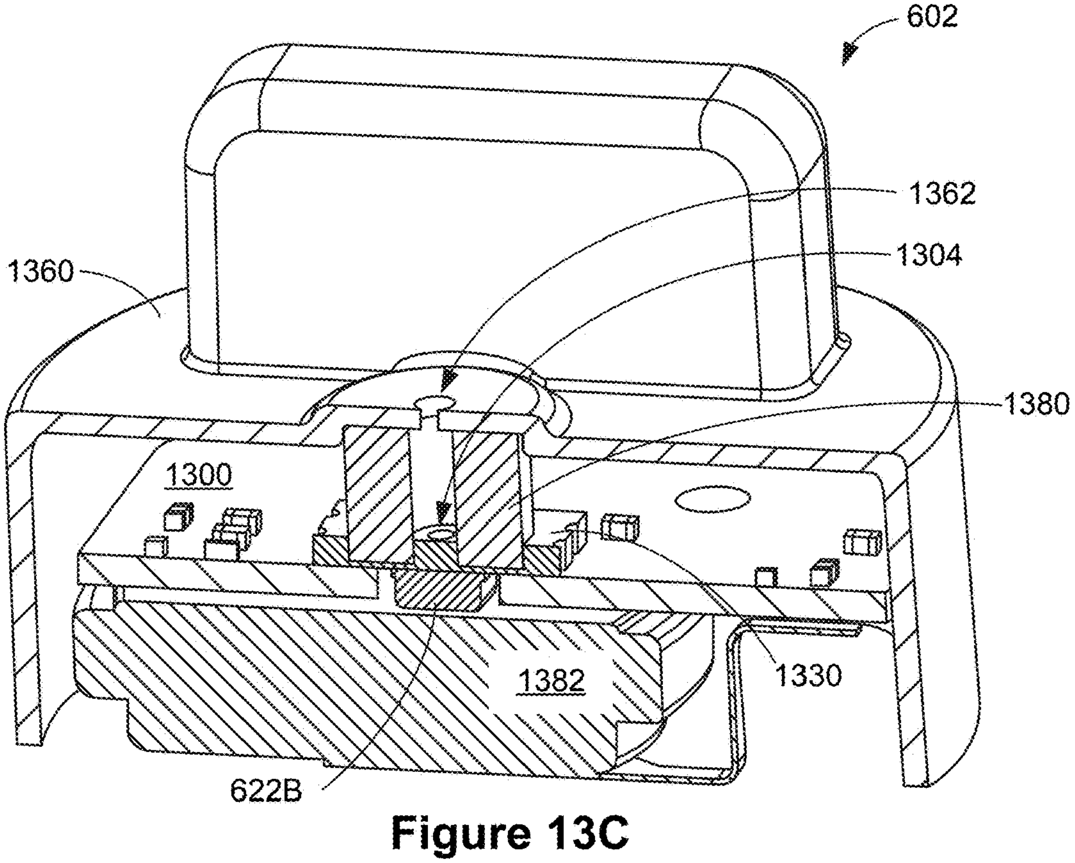
FIG. 13C illustrates a cross-sectional view of the sensor shown in FIG. 13B, according to some embodiments.
Figure 13D:
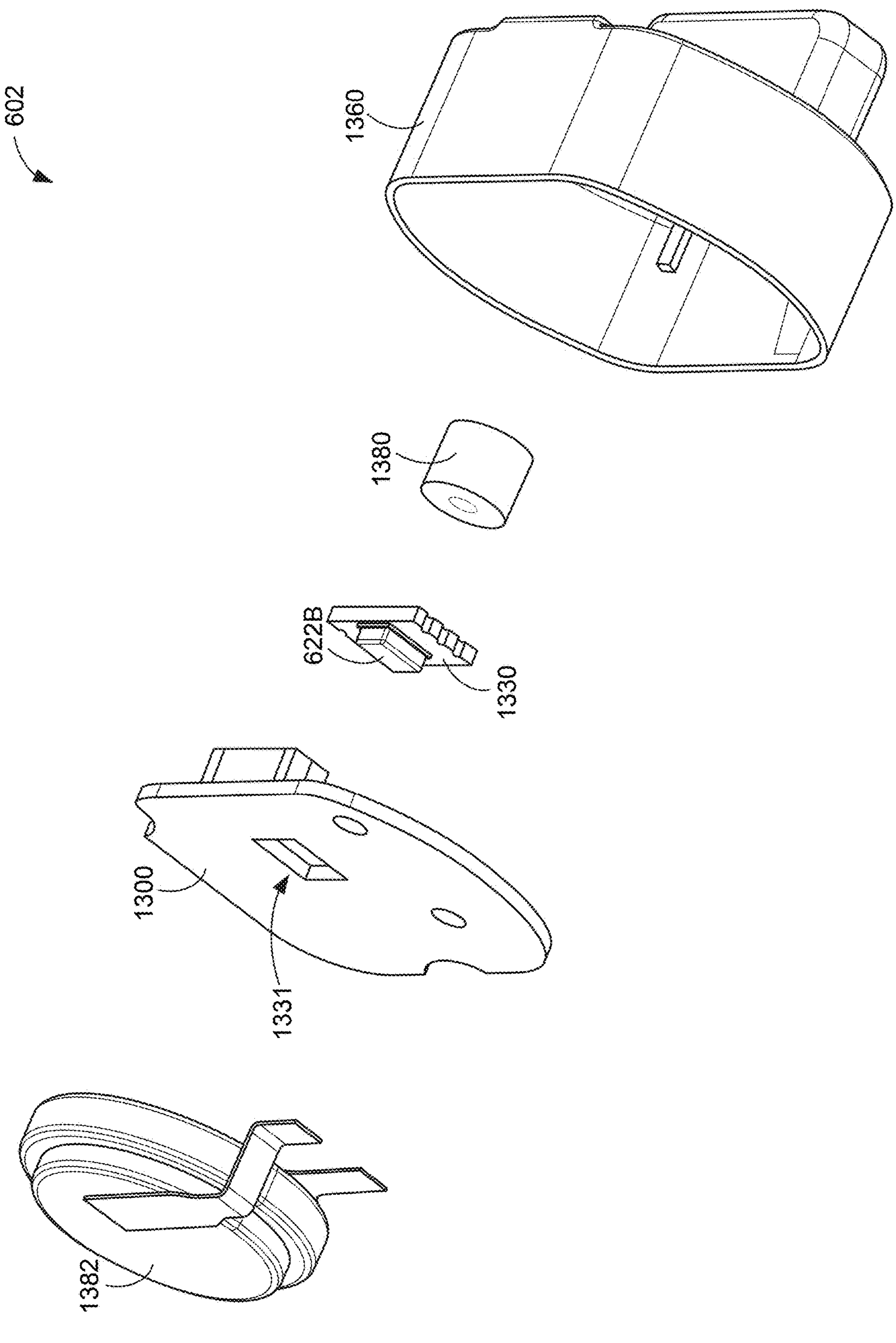
FIG. 13D illustrates an exploded view of the exemplary environmentally isolated micro-electrical system microphone shown in FIG. 13B, according to some embodiments.

FIGS. 13B-13D illustrate an example of an environmentally isolated sensor 602 that includes a micro-electrical system microphone 622B, according to some embodiments. FIG. 13B shows the housing 1360 as transparent so that other components of the sensor 602 can be clearly visualized. FIG. 13C illustrates a cross-sectional view of the sensor shown in FIG. 13B so that the relative positions of the sensor 602 can be clearly visualized, and FIG. 13D illustrates an exploded view of the environmentally isolated micro-electrical system microphone 622B shown in FIG. 13B so that each component can be clearly visualized.

Referring to FIGS. 13B and 13C, in some embodiments, the housing 1360 includes a hole 1362 to allow sound waves to reach the MEMS microphone 622B. In some embodiments, the sensor 602 also includes a seal 1380. In some embodiments, the seal 1380 is a cylindrical seal having a hollow center. The seal 1380 is configured to fill the gap between the MEMS microphone 622B (or the PCB 1330 of the MEMS microphone 622B) and the housing 1360, while creating an air channel (through a hollow portion of the cylindrical seal 1380) between the hole 1362 in the housing 1360 and the hole 1304 in the PCB 1330 so that sound waves may be transmitted through the housing 1360 to the MEMS microphone 622B. In some embodiments, the seal 1380 is composed of a vibrationally insulating material such as rubber or another material having similar properties as rubber. In some embodiments, the sensor 602 also includes a battery 1382 configured to provide power to the MEMS microphone 622B and the ASIC 1302 (shown in FIG. 13A). In some embodiments, the MEMS microphone 622B and the ASIC 1302 are energy efficient (e.g., functions using very little battery power) and thus, the battery 1382 can be a small battery having a small form factor, such as a CR2050 battery, for example.

Referring to FIG. 13D, in some embodiments, the sensor 602 also includes a PCB 1300 (separate from the PCB 1330). In some embodiments, components of the sensor 602 other than the MEMS microphone 622B (such as the ADC 624, the processor 636, the transceiver 628 (e.g., wireless transceiver), and the neural network circuit 640, shown in FIGS. 6B and 7) are disposed on (e.g., mounted on, mounted directly on) the PCB 1300. In some embodiments, the ASIC 1302 is also mounted on the PCB 1300.

In some embodiments, as shown in FIG. 13D, the PCB 1300 includes a cutout 1331 that is configured to accommodate the MEMS microphone 622B, and the PCB 1330 is mounted on the PCB 1300. This mounting scheme allows the hole 1304 in PCB 1330 to be aligned with the hole 1362 of the housing 1360 (and the air channel in the cylindrical seal 1380) without requiring extremely tight tolerances in the manufacturing of the housing 1360 and the PCB 1330. In some embodiments, the battery 1382 is also mounted on the PCB 1300.

Figure 14A:
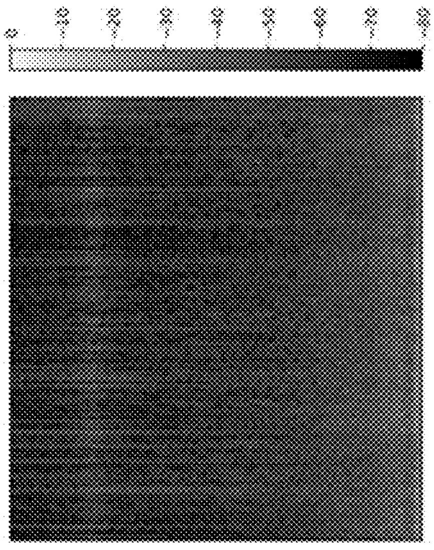
FIGS. 14A-14D illustrate examples of processed sensor data, according to some embodiments.
Figure 14B:
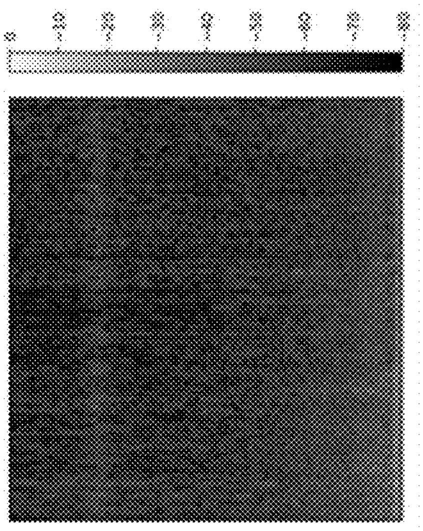
Figure 14C:
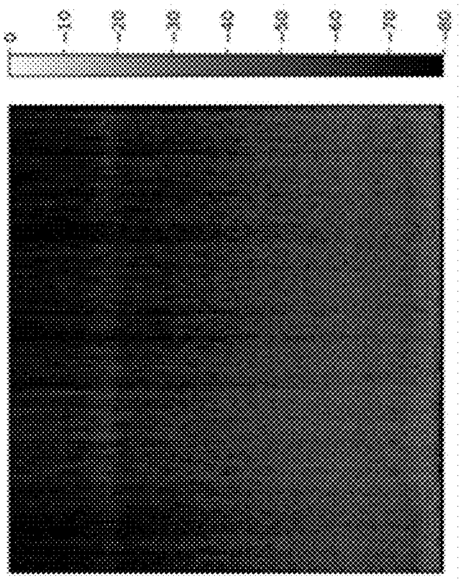
Figure 14D:
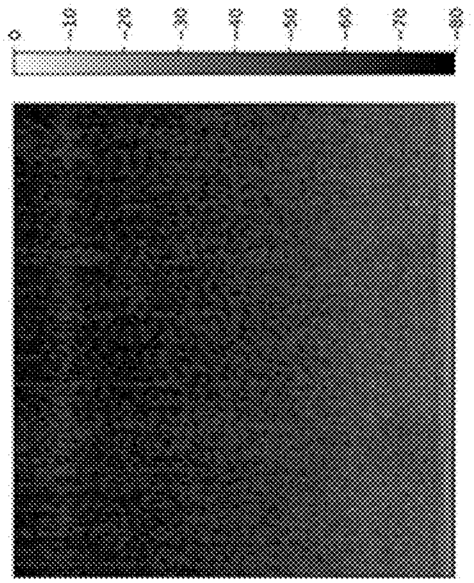

FIGS. 14A-14D illustrate examples of processed sensor data, according to some embodiments. The processed sensor data shown in FIGS. 14A-14D are Fourier spectra of sensor data (e.g., raw data) recorded using a sensor 602 (having a MEMS microphone 622B) disposed inside a tire 620. The Fourier spectra are obtained by performing a Fourier transform of the raw data collected by the sensor 602. FIG. 14A illustrates a Fourier spectrum of sensor data collected over an icy road surface. FIG. 14B illustrates a Fourier spectrum of sensor data collected over a snowy road surface. FIG. 14C illustrates a Fourier spectrum of sensor data collected over a wet road surface. FIG. 14F illustrates a Fourier spectrum of sensor data collected over a dry road surface. As shown, the Fourier spectra look different from each other. Further analysis (such as frequency component analysis, principal component analysis, neural net analysis, or Kalman filtering, for example) of the Fourier spectrum for each road condition reveals frequency-dependent characteristics that are unique to each road condition and can be used to identify a road condition or to distinguish spectra collected over different road conditions.

Figure 15:
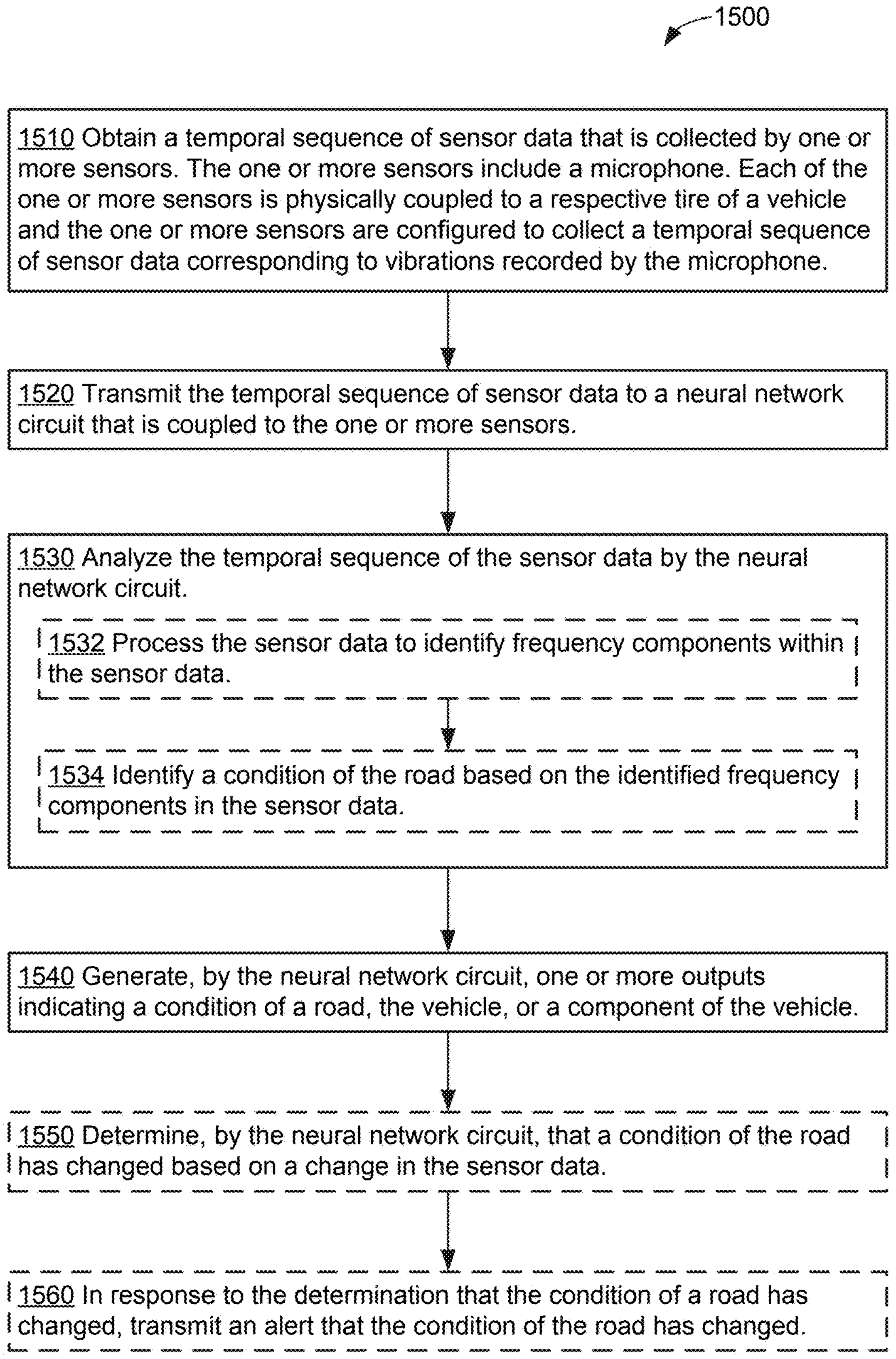
FIG. 15 is a flow diagram of a method of processing vehicle data using a tire sensor system, according to some embodiments.

FIG. 15 is a flow diagram of a method 1500 of processing vehicle data using a tire sensor system 602, according to some embodiments. The method 1500 includes obtaining (step 1510) a temporal sequence of sensor data that is collected by one or more sensors 622. The one or more sensors 622 include a microphone 622B, and each of the one or more sensors 622 is physically coupled to a respective tire 620 of a vehicle 600 and configured to collect a temporal sequence of sensor data 634B corresponding to vibrations recorded by the microphone 622B. The method 1500 also includes transmitting (step 1520) the temporal sequence of sensor data 634B to a neural network circuit that is coupled to the one or more sensors 622 and analyzing (step 1530), by the neural network circuit 640, the temporal sequence of sensor data 634B. The method 1500 further includes generating (step 1540), by the neural network circuit 640, one or more outputs 638 indicating a condition of a road (e.g., condition of a road surface 1200), the vehicle 600, or a component of the vehicle 600.

In some implementations, the analyzing (step 1530) further includes processing (step 1532) the sensor data 634B to identify frequency components within the sensor data 634B and identifying (1534) a condition of the road based on the identified frequency components in the sensor data 634B.

In some implementations, the method 1500 further includes determining (step 1550), by the neural network circuit 640, that the condition of a road (e.g., the condition of the road surface 1200) has changed based on a change in the sensor data 634B. In response to the determination that the condition of the road has changed, the method transmits (step 1560) an alert that the condition of the road has changed.

Figure 16:
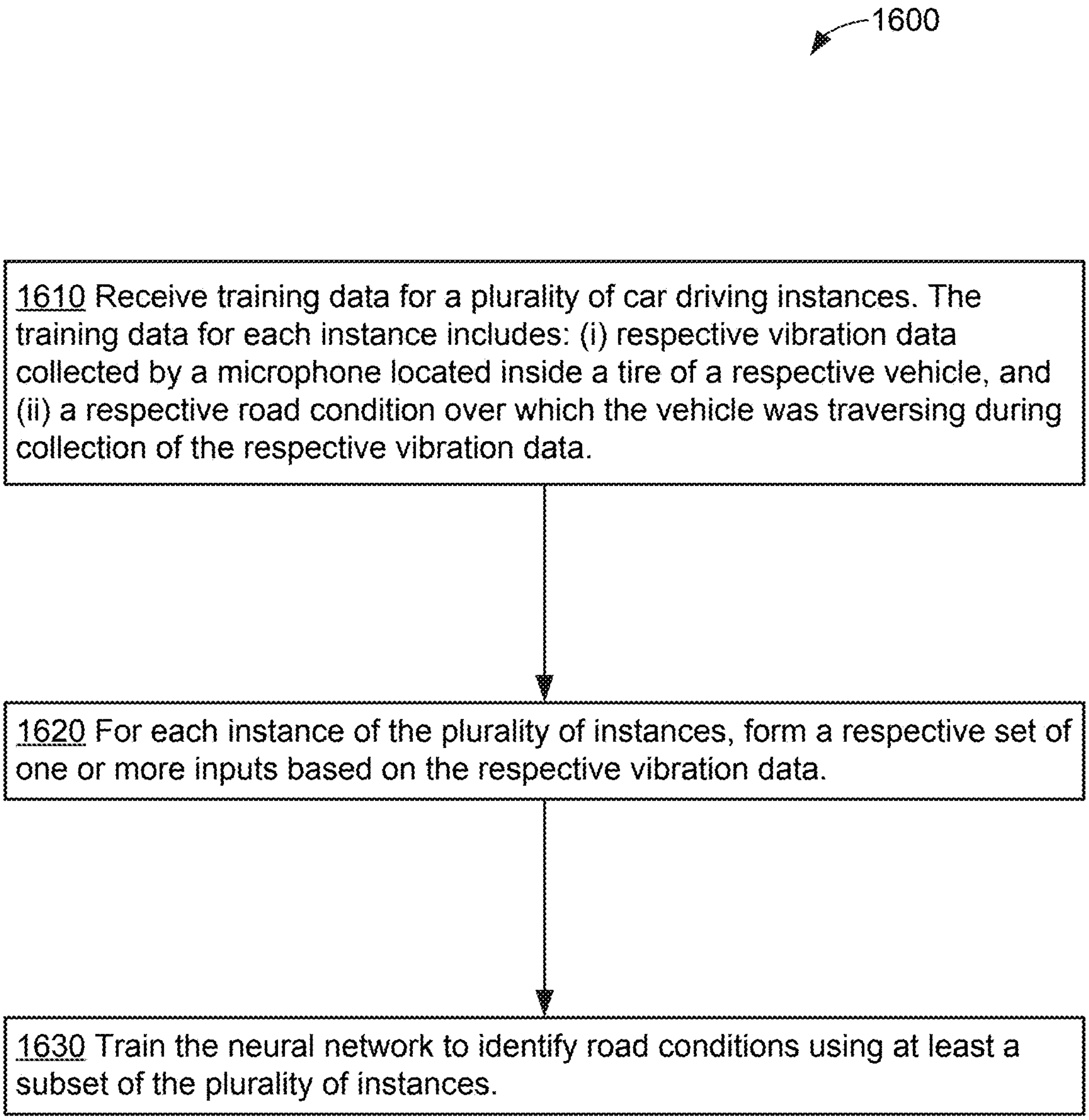
FIG. 16 is a flow diagram of a method of training a neural network to identify a condition of a road, according to some embodiments.

FIG. 16 is a flow diagram of a method 1600 of training a neural network to identify the condition of a road (e.g., the condition of a road surface 1200), according to some embodiments. The method 1600 includes receiving (step 1610) training data for a plurality of car driving instances. The training data for each instance includes: (i) respective vibration data collected by a microphone 622B located inside a tire 620 of a respective vehicle 600 and (ii) a respective road condition (e.g., the condition of the road surface 1200) over which the vehicle 600 was traversing during collection of the respective vibration data. The method 1600 further includes, for each instance of the plurality of instances, forming (step 1620) a respective set of one or more inputs based on the respective vibration data; and training (step 1630) the neural network to identify road conditions using at least a subset of the instances.

Figure 17:
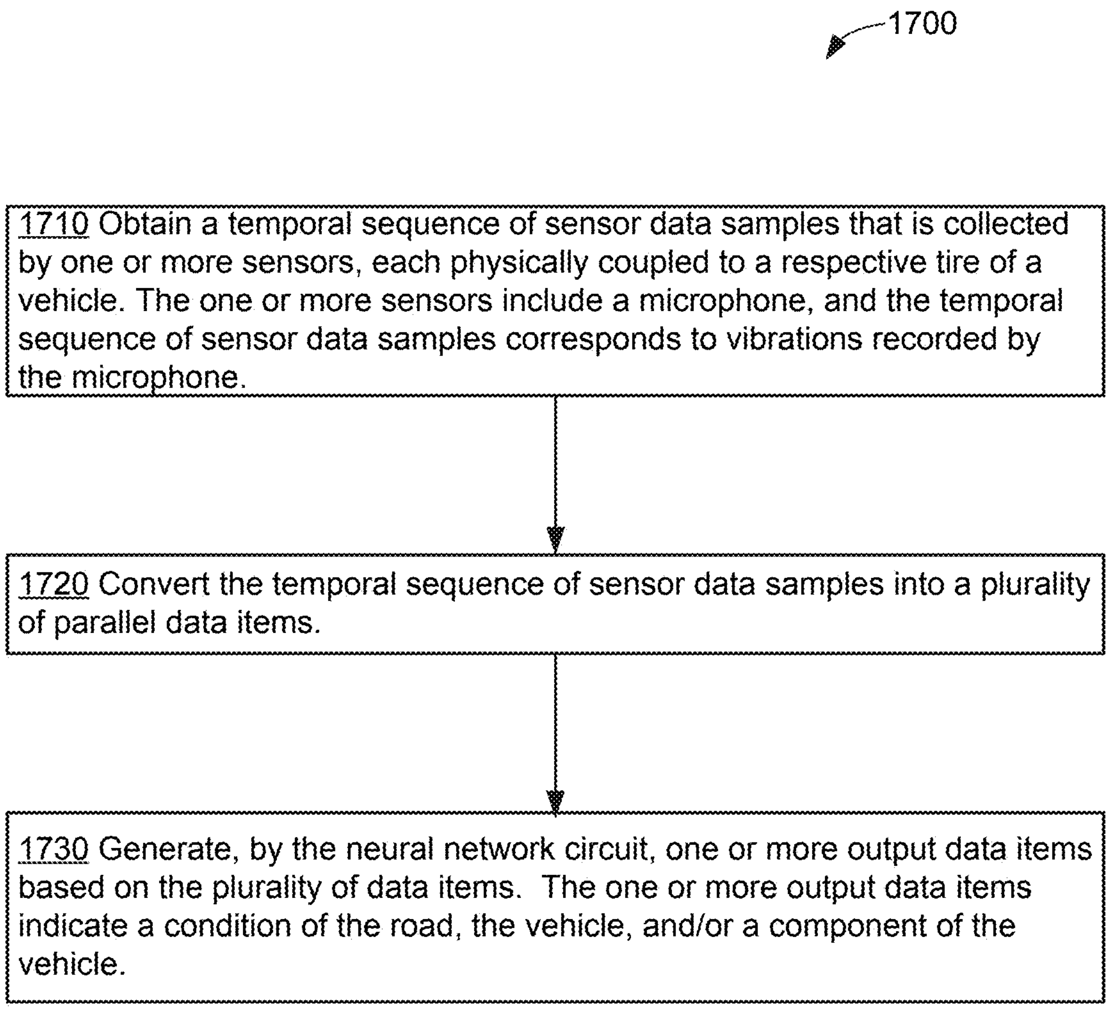
FIG. 17 is a flow diagram of a method of processing vehicle data, according to some embodiments.

FIG. 17 is a flow diagram of a method 1700 of processing vehicle data, according to some embodiments. The method 1700 includes obtaining (step 1710) a temporal sequence of sensor data samples 634B that is collected by one or more sensors 622 physically coupled to tires 620 of a vehicle 600. The one or more sensors 622 include a microphone 622B, and the temporal sequence of sensor data samples 634B corresponds to vibrations recorded by the microphone 622B. The method 1700 also includes converting (step 1720) the temporal sequence of sensor data samples 634B into a plurality of parallel data items 704C and providing (step 1730) the plurality of parallel data items 704C as a plurality of inputs to a neural network circuit 640. The method 1700 further includes generating (step 1740), by the neural network circuit 640, one or more output data items 638 based on the plurality of data items 704C. The one or more output data items 638 indicate a condition of a road, the vehicle, and/or a component of the vehicle.

Turning now to some implementations.

(A1) An electronic device includes one or more sensors, including a microphone. The one or more sensors are physically coupled to tires of a vehicle and configured to collect a temporal sequence of sensor data corresponding to vibrations recorded by the microphone. The electronic device also includes a neural network circuit that is coupled to the sensor. The neural network circuit is configured to receive the sensor data and generate one or more output data items based on analysis of the sensor data. The one or more output data items indicate a condition of a road, the vehicle, and/or a component of the vehicle.

(A2) The electronic device of A1, where the microphone is a micro-electromechanical system that includes a diaphragm configured to deform in at least one direction in response to a change in air pressure. The vibrations recorded by the microphone correspond to deformation of the diaphragm.

(A3) The electronic device of A1 or A2, where the sensors are positioned inside the tire of the vehicle, the sensors include a chamber that is environmentally isolated from changes in air pressure inside the tire, and the microphone is located inside the chamber.

(A4) The electronic device of any of A1-A3, where the neural network circuit includes an analog hardware circuit.

(A5) The electronic device of any of A1-A4, where the neural network circuit is configured to implement a convolutional neural network (CNN), a recurrent neural network (RNN), a transformer, and/or an autoencoder.

(A6) The electronic device of any of A1-A5, where analysis of the sensor data, by the neural network circuit, includes: (i) processing the sensor data to identify frequency components within the sensor data and (ii) identifying the condition of the road based on the identified frequency components in the sensor data.

(A7) The electronic device of any of A1-A6, where the neural network circuit is configured to identify a change in condition of the road based on analysis of the identified frequency components in the sensor data.

The neural network circuit is also configured to, in response to the identification that the condition of the road has changed from a first road condition to a second road condition, transmit an alert indicating the change in the condition of the road. The second road condition is different from the first road condition.

(A8) The electronic device of any of A1-A7, where the identified frequency components include frequency components within a frequency range between 10 Hz-10 kHz.

(B1) A method for processing vehicle data includes obtaining a temporal sequence of sensor data that is collected by one or more sensors. The one or more sensors include a microphone and the one or more sensors are physically coupled to a tire of a vehicle and configured to collect a temporal sequence of sensor data corresponding to vibrations recorded by the microphone. The method also includes transmitting the temporal sequence of sensor data to a neural network circuit that is coupled to the one or more sensors and analyzing, by the neural network circuit, the temporal sequence of sensor data. The method also includes generating, by the neural network circuit, one or more outputs indicating the condition of a road, the vehicle, or a component of the vehicle.

(B2) The method of B1, where the neural network circuit includes an analog hardware circuit.

(B3) The method of B1 or B2, where the microphone is a micro-electromechanical system (MEMS) that includes a diaphragm configured to deform in at least one direction in response to a change in air pressure. The sensor data corresponds to deformation of the diaphragm.

(B4) The method of any of B1-B3, where the sensor is positioned inside the tire of the vehicle, the sensor includes a chamber that is environmentally isolated from changes in air pressure inside the tire, and the microphone is located inside the chamber.

(B5) The method of any of B1-B4, where the neural network circuit is configured to implement a convolutional neural network (CNN), a recurrent neural network (RNN), a transformer, and/or an autoencoder.

(B6) The method of any of B1-B5, where analyzing the sensor data by the neural network circuit includes: (i) processing the sensor data to identify frequency components within the sensor data and (ii) identifying a condition of the road based on the identified frequency components in the sensor data.

(B7) The method of any of B1-B6, further including: (i) determining, by the neural network circuit, that a condition of a road has changed based on a change in the sensor data, and (ii) in response to the determination that the condition of a road has changed, transmitting an alert that the condition of the road has changed.

(B8) The method of any of B1-B7, where the identified frequency components include frequency components within a frequency range of 10 Hz-10 KHz.

(C1) A method for training a neural network to identify a condition of a road includes receiving training data for a plurality of car driving instances. The training data for each instance includes: (i) respective vibration data collected by a microphone located inside a tire of a respective vehicle and (ii) a respective road condition over which the vehicle was traversing during collection of the respective vibration data. The method further includes, for each instance of the plurality of instances, forming a respective set of one or more inputs based on the respective vibration data. The method also includes training the neural network to identify a road condition using at least a subset of the instances.

(D1) A method includes obtaining a temporal sequence of sensor data samples that is collected by one or more sensors physically coupled to a tire of a vehicle. The one or more sensors include a microphone, and the temporal sequence of sensor data samples corresponds to vibrations recorded by the microphone. The method also includes converting the temporal sequence of sensor data samples into a plurality of parallel data items and providing the plurality of parallel data items as a plurality of inputs to a neural network circuit. The method further includes generating, by the neural network circuit, one or more output data items based on the plurality of data items. The one or more output data items indicate a condition of a road, the vehicle, and/or a component of the vehicle.

(D2) The method of D1, where the neural network circuit is configured to implement a convolutional neural network (CNN), a recurrent neural network (RNN), a transformer, and/or an autoencoder.

(D3) The method of D1 or D2, where the neural network circuit includes an analog hardware circuit.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:

one or more sensors physically coupled to a tire of a vehicle, wherein:

the one or more sensors includes a first sensor configured to collect a temporal sequence of first sensor data used to provide a plurality of first parallel data items and a second sensor configured to collect a temporal sequence of second data used to provide a plurality of second parallel data items;

the first sensor is different from the second sensor;

the temporal sequence of first sensor data is different from the temporal sequence of second sensor data; and the plurality of first parallel data items is different from the plurality of second parallel data items; and a neural network circuit coupled to the sensor, wherein:

the neural network circuit is configured to receive the plurality of first parallel data items and the plurality of second parallel data items and generate one or more output data items based on analysis of the plurality of first parallel data items and the plurality of second parallel data items; and the one or more output data items indicate a condition of a road, the vehicle, and/or a component of the vehicle.

2. The electronic device of claim 1, wherein the first sensor is positioned inside the tire of the vehicle.

3. The electronic device of claim 1, wherein the neural network circuit includes an analog hardware circuit.

4. The electronic device of claim 1, wherein the neural network circuit is configured to implement a convolutional neural network (CNN), a recurrent neural network (RNN), a transformer, and/or an autoencoder.

5. The electronic device of claim 1, wherein analysis of the first sensor data and the second sensor data, by the neural network circuit, includes:

processing the first sensor data to identify frequency components within the first sensor data; and identifying a condition of the road based, at least in part, on the identified frequency components in the first sensor data.

6. The electronic device of claim 5, wherein:

the neural network circuit is configured to identify a change in a condition of the road based on analysis of the identified frequency components in the first sensor data; and in response to an identification that the condition of the road has changed from a first road condition to a second road condition, transmitting an alert indicating the change in the condition of the road, wherein the second road condition is different from the first road condition.

7. The electronic device of claim 5, wherein:

the identified frequency components include frequency components within a frequency range between 10 Hz-10 kHz.

8. A method for processing vehicle data, comprising:

obtaining a first temporal sequence of sensor data that is collected by a first sensor that is physically coupled to a tire of a vehicle;

obtaining a second temporal sequence of data that is collected by a second sensor, wherein the second sensor is different from the first sensor and the second temporal sequence of data is different from the first temporal sequence of data;

transmitting the first temporal sequence of sensor data and the second temporal sequence of sensor data to a neural network circuit that is coupled to each of the first sensor and the second sensor;

analyzing in parallel, by the neural network circuit, the first temporal sequence of sensor data and the second temporal sequence of sensor data;

and generating, by the neural network circuit, one or more outputs indicating a condition of a road, the vehicle, and/or a component of the vehicle, wherein the one or more outputs are generated based on the first temporal sequence of data and the second temporal sequence of data.

9. The method of claim 8, wherein the neural network circuit includes an analog hardware circuit.

10. The method of claim 8, wherein the first sensor is positioned inside the tire of the vehicle.

11. The method of claim 8, wherein the neural network circuit is configured to implement a convolutional neural network (CNN), a recurrent neural network (RNN), a transformer, and/or an autoencoder.

12. The method of claim 8, wherein analyzing the sensor data by the neural network circuit includes:

processing the first temporal sequence of sensor data to identify frequency components within the first temporal sequence of sensor data; and identifying a condition of the road based on the identified frequency components in the first temporal sequence of sensor data.

13. The method of claim 12, further comprising:

determining, by the neural network circuit, that a condition of a road has changed based on a change in the first temporal sequence of sensor data and/or the second temporal sequence of sensor data; and in response to the determination that the condition of a road has changed, transmitting an alert that the condition of the road has changed.

14. The method of claim 12, wherein:

the identified frequency components include frequency components within a frequency range of 10 Hz-10 kHz.

15. A method, comprising:

obtaining a first temporal sequence of sensor data samples that is collected by a first sensor that is physically coupled to a tire of a vehicle;

obtaining a second temporal sequence of data samples that is collected by a second sensor, wherein the second sensor is different from the first sensor and the second temporal sequence of data samples is different from the first temporal sequence of data samples;

converting the first temporal sequence of sensor data samples into a plurality of first parallel data items;

converting the second temporal sequence of sensor data samples into a plurality of second parallel data items;

providing the plurality of first parallel data items as a plurality of first inputs to a neural network circuit;

providing the plurality of second parallel data items as a plurality of second inputs to the neural network circuit; and generating, by the neural network circuit, one or more output data items based on the first plurality of parallel data items and the plurality of second parallel data items, the one or more output data items indicating a condition of a road, the vehicle, and/or a component of the vehicle.

16. The method of claim 15, wherein the neural network circuit is configured to implement a convolutional neural network (CNN), a recurrent neural network (RNN), a transformer, and/or an autoencoder.

17. The method of claim 16, wherein the neural network circuit includes an analog hardware circuit.

* * * * *